US010013388B1

(12) United States Patent
Wang

(10) Patent No.: US 10,013,388 B1
(45) Date of Patent: Jul. 3, 2018

(54) DYNAMIC PEER-TO-PEER CONFIGURATION

(71) Applicant: Amazon Technologies, Inc., Seattle, WA (US)

(72) Inventor: Wei Wang, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/383,800

(22) Filed: Dec. 19, 2016

(51) Int. Cl.
| | |
|---|---|
| G06F 3/00 | (2006.01) |
| G06F 13/42 | (2006.01) |
| G06F 13/10 | (2006.01) |
| G06F 13/20 | (2006.01) |
| G06F 13/40 | (2006.01) |
| G06F 12/06 | (2006.01) |
| G06F 9/4401 | (2018.01) |

(52) U.S. Cl.
CPC ........ *G06F 13/4282* (2013.01); *G06F 9/4411* (2013.01); *G06F 12/0661* (2013.01); *G06F 13/102* (2013.01); *G06F 13/20* (2013.01); *G06F 13/4022* (2013.01); *G06F 13/4068* (2013.01); *G06F 2213/0024* (2013.01); *G06F 2213/0026* (2013.01)

(58) Field of Classification Search
USPC ................ 710/8–16, 104–110; 709/200–203
See application file for complete search history.

(56) References Cited

U.S. PATENT DOCUMENTS

| | | | | |
|---|---|---|---|---|
| 8,954,959 | B2 * | 2/2015 | Tsirkin | G06F 12/1009 710/22 |
| 9,037,770 | B2 * | 5/2015 | Biran | G06F 13/4022 710/311 |
| 9,424,199 | B2 * | 8/2016 | Kegel | G06F 12/1009 |
| 9,514,507 | B2 * | 12/2016 | McKenzie | G06T 1/20 |
| 9,712,486 | B2 * | 7/2017 | Johnson | G06F 8/60 |
| 2012/0072619 | A1 * | 3/2012 | Tsirkin | G06F 9/45558 710/26 |
| 2012/0072906 | A1 * | 3/2012 | Tsirkin | G06F 12/1009 718/1 |
| 2015/0052282 | A1 * | 2/2015 | Dong | G06F 13/32 710/308 |
| 2017/0031593 | A1 * | 2/2017 | Tsirkin | G06F 3/061 |
| 2017/0249465 | A1 * | 8/2017 | Tsirkin | G06F 9/45558 |

* cited by examiner

*Primary Examiner* — Raymond Phan
(74) *Attorney, Agent, or Firm* — Kilpatrick Townsend & Stockton LLP

(57) ABSTRACT

Provided are systems, methods, and computer-program products for enabling peer-to-peer communications between peripheral devices in a computing system. In various implementations, a host device in the computing system can read an address from a peripheral device included in the computing system. The host device can further configure an emulated peripheral device corresponding to the peripheral device, including writing the address to an emulated register of the emulated peripheral device. The host device can further initiate a virtual machine, including reading the address from the emulated register, initializing a page table for the virtual machine, and initiating a guest operating system. The guest operating system can be operable to use the address to access the physical device.

25 Claims, 12 Drawing Sheets

DYNAMIC PEER-TO-PEER CONFIGURATION

BACKGROUND

Computing systems generally include peripheral devices. A peripheral device is a device that can extend, adapt, and/or modify the functionality of the computing system. Peripheral devices may be connected to a computing system internally or externally, and typically communicate with a computing system through one or more busses. The manner in which data is transferred on a bus is typically defined by a bus protocol. Examples of bus protocols include the Peripheral Component Interconnect (PCI) family of bus protocols (e.g., PCI, PCI-eXtended (PCI-X), PCI Express (PCIe), PCI derivatives such as Accelerated Graphics Port (AGP), etc.), among others.

In some computing systems, it may be desirable for one peripheral device to be able to use the resources of another peripheral device. For example, a PCI-based peripheral device may include a graphics processing unit (GPU). In many cases, a computing system may include multiple PCI devices, each hosting a GPU. In such systems, mathematical operations can be executed on multiple GPUs in parallel. When multiple GPUs are operating on the same data, one GPU may need access to the memory of another GPU to, for example, provide computational results or to obtain computational results.

Generally, when a peripheral device uses the resources of another peripheral device, the peripheral devices use a peer-to-peer communication system. "Peer-to-peer" generally describes a distributed architecture where tasks are partitioned between "peers" in a system. In a peer-to-peer system, the peers generally make at least a portion of their resources—such as processing power, disk storage, memory, and/or network bandwidth—directly available to other peers, without the need for central coordination by a host processor.

When the computing system uses a virtualized software environment peer-to-peer transactions may need to be sent to a host device in the system for address translation. In a virtualized software environment, the PCI endpoints may be configured and controlled by a guest operating system, executing a virtual machine. The virtual machine uses a virtual address space, which is typically different from the physical address space of the computing system. The guest operating system thus may have configured the PCI endpoints with virtual addresses, such that a peer-to-peer transaction from one PCI endpoint uses a virtual address to send a transaction to another PCI endpoint.

To provide address translations, the host device can include an Input/Output Memory Management Unit (IOMMU). A peer-to-peer transaction can be sent to the host device, where the host device translates the transaction's virtual address to a physical address. The host device can then send the transaction to the appropriate PCI endpoint.

BRIEF DESCRIPTION OF THE DRAWINGS

Various embodiments in accordance with the present disclosure will be described with reference to the drawings, in which.

DETAILED DESCRIPTION

Figure 1:
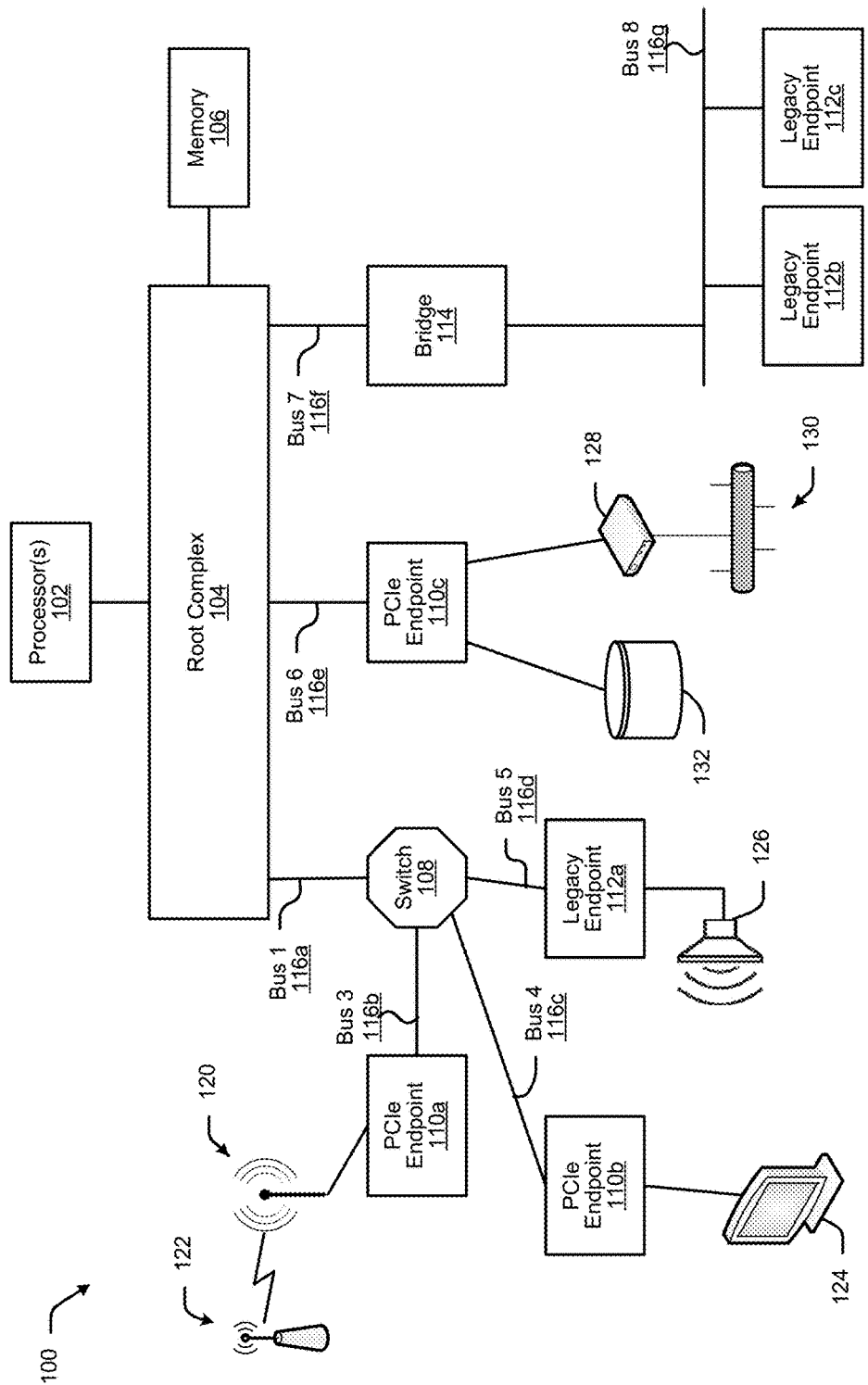
FIG. 1 illustrates an example of a computing system that includes multiple peripheral devices.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Computing systems generally include peripheral devices. A peripheral device is a device that can extend, adapt, and/or modify the functionality of the computing system. For example, peripheral devices may provide storage, network connectivity, and/or audio and video support to a computing system. Peripheral devices may be connected to a computing system internally or externally, and typically communicate with a computing system through one or more busses. The manner in which data is transferred on a bus is typically defined by a bus protocol. Examples of bus protocols include the Peripheral Component Interconnect (PCI) family of bus protocols (e.g., PCI, PCI-eXtended (PCI-X), PCI Express (PCIe), PCI derivatives such as Accelerated Graphics Port (AGP), etc.), among others. A bus or device that uses a protocol from among the PCI family of protocols may be referred to herein as a PCI-based bus or device.

In some computing systems, it may be desirable for one peripheral device to be able to use the resources of another peripheral device. For example, a PCI-based peripheral device may include a graphics processing unit (GPU). A GPU is an integrated circuit device designed to perform rapid mathematical calculations, generally executing multiple calculations in parallel. GPUs can be used for rendering computer graphics, as well as for other computationally heavy operations, such as financial modeling, weather modeling, and scientific research. In many cases, a computing system may include multiple PCI devices, each hosting a GPU. In such systems, mathematical operations can be executed on multiple GPUs in parallel. When multiple GPUs are operating on the same data, one GPU may need access to the memory of another GPU to, for example, provide computational results or to obtain computational results.

A PCI-based peripheral device with a GPU is presented as one example where one peripheral device may use the resources of another peripheral device. Other examples include peripheral devices with massively parallel computation capabilities, implemented, for example, using one or more field programmable gate arrays (FPGA). Other examples include peripheral devices with co-processors. Other examples include networking applications, where a network interface card may transmit transactions directly to another network card. Other examples include storage applications, where one storage interface card may read and write directly to another storage interface card. Other examples include network security applications, where one encryption card can encrypt data on a different encryption card.

Generally, when a peripheral device uses the resources of another peripheral device, the peripheral devices use a peer-to-peer communication system. "Peer-to-peer" generally describes a distributed architecture where tasks are partitioned between "peers" in a system. Peers are generally equally privileged and equal participants in a system, in contrast to a client-server system, where the consumption and supply of resources is divided between the server (e.g., the consumer) and the client (e.g., the supplier). In a peer-to-peer system, the peers generally make at least a portion of their resources—such as processing power, disk storage, memory, and/or network bandwidth—directly available to other peers, without the need for central coordination by a host processor.

In a computing system that uses PCI as the interconnect between peripheral devices, the PCI protocol and the topology of the system can provide communication channels for peer-to-peer communications between PCI devices. For example, two PCI endpoint devices can be connected, directly or indirectly, to the same PCI switch device. In such a case, one PCI endpoint can send transactions to the switch device, which can then send the transactions to the second PCI endpoint. In this example, transactions need not be sent from the switch to a processor in the system, for the processor to then route the transaction to the correct recipient endpoint device.

When the computing system uses a virtualized software environment, however, peer-to-peer transactions may need to be sent to a host device in the system for address translation. In a virtualized software environment, the PCI endpoints may be configured and controlled by a guest operating system, executing a virtual machine. The virtual machine uses a virtual address space, which is typically different from the physical address space of the computing system. The guest operating system thus may have configured the PCI endpoints with virtual addresses, such that a peer-to-peer transaction from one PCI endpoint uses a virtual address to send a transaction to another PCI endpoint.

To provide address translations, the host device can include an Input/Output Memory Management Unit (IOMMU). A peer-to-peer transaction can be sent to the host device, where the host device translates the transaction's virtual address to a physical address. The host device can then send the transaction to the appropriate PCI endpoint.

In a computing system with a virtualized software environment, peer-to-peer transactions thus require additional processing, which can add delay in the transaction being executed. When the computing system executes few peer-to-peer transactions, address translations may not be an intolerable burden. When the computing system executes many peer-to-peer transactions, however, address translation may become a bottleneck, making it difficult for the peripheral devices to operate at full capacity.

In various implementations, provided are techniques for dynamically configuring a computing system with a virtualized software environment for peer-to-peer communications, where address translations can be avoided. In various implementations, these techniques include having an emulator application determine whether the system is being configured for peer-to-peer communication. The emulator application may be run as part of the virtualized software environment, to provide emulated hardware devices to a virtual machine. When the emulator application determines that peer-to-peer communications are being enabled, the emulator application can further read physical addresses for the peripheral devices that will execute peer-to-peer communications. The physical addresses can represent base addresses of address ranges configured for the peripheral devices. The emulator application can further write the physical addresses into emulated registers in emulated peripheral devices. The emulated peripheral devices can represent the physical peripheral devices to the virtual machine.

Configuration of the system can further include configuring a guest firmware application to read the addresses from the emulated registers. The guest firmware application can be launched to initialize a virtual machine. The guest firmware application can verify the addresses, and then write the addresses back to the emulated registers. Doing so can cause the emulator application to initialize page tables for the virtual machine. The page tables ordinarily provide virtual-to-physical address mapping, to translate the virtual addresses used within the virtual machine to physical addresses used by the physical components of the system. By writing the addresses read from the peripheral devices to the emulated registers, however, the page tables are instead configured to provide physical-to-physical address mapping, meaning the physical addresses are mapped back to themselves.

When the guest operating system is launched, the guest operating system is thus provided with the physical addresses of the peripheral devices, where the guest operating system would otherwise be provided with virtual addresses. The guest operating system need not be informed that the addresses it is using are physical addresses, and the guest operating system can function as normal, including configuring peripheral devices for peer-to-peer communication. For example, the guest operating system can provide one peripheral device with the addresses of another peripheral device, which the first peripheral device can subsequently use to generate peer-to-peer transactions to the second peripheral device. Because the guest operating system has physical addresses for the second peripheral device, instead of virtual addresses, the first peripheral device will be configured with physical addresses for the second peripheral device. Thus, peer-to-peer transactions from the first peripheral device to the second peripheral device will have physical addresses, and not need address translation.

In various implementations, dynamically configuring a computing system for peer-to-peer transactions can also include configuring a hardware emulator table. A hardware emulator table may be provided, in some systems, as a component of an Advanced Configuration and Power Interface (ACPI). The hardware emulator table can be used by the guest operating system to access hardware components, including configuring the address spaces of peripheral devices.

Should the guest operating system be allowed to reassign the peripheral devices to other address ranges, peer-to-peer communication would become inoperable. Thus, in various implementations, the hardware emulator table can be compiled with placeholder addresses, which can be used to reserve an address space for each peripheral device that will execute peer-to-peer communications. By reserving an address space for each peripheral device, the guest operating system can be made to avoid determining and configuring address spaces for these devices. The guest firmware, which can obtain physical addresses for peripheral devices as discussed above, can write the physical addresses to the hardware emulator table. In these implementations, the guest operating system can thus be provided with the physical addresses for the peripheral devices, and can use the physical addresses to configure the peripheral devices for peer-to-peer communication.

FIG. 1 illustrates an example of a computing system 100 that includes multiple peripheral devices. Peripheral devices can include hardware devices and/or devices that include a combination of hardware and software, which can be attached to a computing system to add functionality to the computing system 100. Examples of peripheral devices include storage devices, displays, speakers, wired and/or wireless network adapters, adapters to provide additional ports to the system (such as serial and/or parallel ports), bridges, hubs, and/or switches that provide ports for additional peripheral devices, and others. Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example of FIG. 1 illustrates a computing system 100 that includes peripheral devices that implement one or more variations of the Peripheral Component Interconnect (PCI) standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. The peripheral devices illustrated in FIG. 1 can also include peripheral devices that implement bus protocols that are based on a PCI bus protocol, such as Non-Volatile Memory Express (NVMe), a bus protocol used for high-speed storage disks that operates on top of a PCIe bus.

In the example shown in FIG. 1, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

The example computing system 100 may include one or more processors 102, a root complex 104, a memory subsystem 106, a switch 108, a bridge 114, and a number of peripheral devices. In this example, the peripheral devices include PCIe endpoints 110a-110c and legacy endpoints 112a-112c. The processors 102 may be general purpose computing devices such as are manufactured by Intel®, AMD®, ARM®, Qualcomm®, an others. The processors 102 are hardware devices that can be implemented using an integrated circuit or a combination of integrated circuits. The processors 102 are generally capable of executing software code. A processor may include multiple processing cores.

The root complex 104 may be a hardware device or a hardware and software device that connects the processors 102 and the memory subsystem 106 to the peripheral devices. The peripheral devices may be connected directly to the root complex 104. For example, the PCIe endpoint 110c is connected directly to the root complex 104. Alternatively or additionally, the peripheral devices may be connected to the root complex 104 through a switch 108. A bridge 114 may also be connected to the root complex 104. The root complex 104 may forward transactions to the processors 102 and direct responses from the processors 102 back to the peripheral devices. The root complex 104 may further generate transactions on behalf of the processors 102, and forward responses to those transactions back to the processors 102. In some cases, the root complex 104 may also route transactions from one peripheral device to another, and/or between peripheral devices, switches, and bridges. The root complex 104 may provide services for the computing system 100, such as a hot plug controller, a power management controller, an interrupt controller, and/or error detection and reporting. In some implementations, the root complex 104 may be implemented as part of a host system that includes one or more integrated processors. In some cases, memory may also be integrated into the host system.

The memory subsystem 106 may provide temporary or long-term storage for data that may be used by the computing system 100. The memory subsystem 106 may include Dynamic Random Access Memory (DRAM), Synchronous DRAM (SDRAM), and/or Double Data Rate (DDR), among others. In some cases, the memory subsystem 106 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others. In some implementations, the root complex 104 may include a memory controller to manage transactions to and from the memory subsystem 106. In other implementations, the processors 102 may include a memory controller. Alternatively or additionally, the computing system 100 may include an external memory controller in communication with either the processors 102, the root complex 104, or both the processors 102 and the root complex 104, and the memory subsystem 106.

Peripheral devices are devices that can generate and/or respond to data transactions. For example, peripheral devices may be "requesters" (transaction generators) and/or "completers" (transaction responders). In PCI implementations, peripheral devices may include PCIe endpoints, where "endpoint" describes a peripheral device that is configured to communicate using a PCI protocol. Other peripheral devices may be legacy endpoints, that is, peripheral devices that are configured to communicate using a PCI protocol other than PCIe, such as the original PCI standard or PCI-X. Though not illustrated here, the computing system 100 may further include peripheral devices that implement another bus standard, such as for example, Small Computer System Interface (SCSI), Serial ATA (SATA), or Parallel ATA (PATA), among others.

The switch 108 functions as a multi-port connecter between various devices, including the root complex 104, peripheral devices, and possibly other switches and bridges. The switch 108 may route transactions between any of the devices connected to it. For example, the switch 108 may route transactions between the PCIe endpoints 110a-110b and the legacy endpoint 112a, and between the various endpoints 110a-110b, 112a and the root complex 104. The switch 108 may also provide arbitration to prioritize incoming and outgoing transactions. Devices connected to the switch 108 may treat the switch 108 as another requester and/or completer. Though not illustrated here, switches can also be connected to other switches to further expand the number of peripheral devices that can be connected to the computing system 100.

The bridge 114 may provide connectivity to other busses or switching fabrics. The other busses or switching fabrics may implement a PCI variant or another protocol. For example, in the example of FIG. 1, the bridge 114 provides connectivity to a bus implementing the original PCI standard. The bridge 114 may include mechanisms to translate from one bus protocol, such as the original PCI standard, to another protocol, such as PCIe.

Components in the computing system 100 may be connected through a shared bus. For example, in the illustrated example, the legacy endpoints 112b-112c are connected to a shared PCI bus 116g. Alternatively or additionally, peripheral devices may be connected to the computing system 100 in a switching fabric topology. The interconnected devices illustrated in FIG. 1, including the root complex 104, the switch 108, the bridge 114, and the PCIe endpoints 110a-110c, form an example of a switching fabric. A switching fabric topology includes point-to-point connections between the devices connected to the fabric, and may include a routing system for passing messages between the devices. In a switching fabric, transactions may be spread across multiple physical links. In the example of FIG. 1, the switch 108 is connected to the root complex 104 with Bus 1 116a and the PCIe endpoint 110c is connected to the root complex with Bus 6 116e. Similarly, the bridge 114 is connected to the root complex with Bus 7 116f. Each of the PCIe endpoints 110a-110b and the legacy endpoint 112a are also connected to the switch 108 with individual busses 116b-116d. The connections between each of the root complex 104, the switch 108, the bridge 114, the PCIe endpoints 110a-110c and the legacy endpoint 112a are point-to-point because each of the busses 116a-116g are not shared with another device. Furthermore, a packet directed from one device to another (for example, from the root complex 104 to the PCIe endpoint 110a) is routed directly to its destination.

In some implementations, the connections between the devices in the computing system 100 may be numbered. For example, in the illustrated example, the connection between the switch 108 and the root complex 104 is labeled Bus 1 116a (Bus 0 may be internal to the root complex 104). Similarly, each of the busses connecting the PCIe endpoints 110a-110b and the legacy endpoint 112a to the switch 108 are labeled Bus 3 116b, Bus 4 116c, and Bus 5 116d, respectively (Bus 2 may be internal to the switch 108). Furthermore, the connection between the root complex 104 and the PCIe endpoint 110c may be labeled Bus 6 116e, while the connection between the root complex and the bridge 114 may be labeled Bus 7 116f. Finally, the shared bus downstream from the bridge 114 may be labeled Bus 8 116g. In most cases, the numbering of the busses is arbitrary, though bus numbers are generally assigned in a logical fashion. For example, Bus 0 may be located within the root complex 104, and the bus label may increment as the distance between the bus and the root complex 104 increases.

As noted above, peripheral devices may add to and/or modify the functionality of the computing system 100. For example, one PCIe endpoint 110a may implement a Wi-Fi adapter 120. Using the Wi-Fi adapter 120, the computing system 100 may be able to communicate wirelessly with a wireless access point 122, and thereby access a network. As another example, another PCIe endpoint 110b may implement a video card. A video card may include a port to connect a monitor 124 or other display device. As a further example, the computing system 100 may include a legacy endpoint 112a that implements a sound card. A sound card may include a port or jack that accepts a plug for a speaker 126 or other audio output device.

In some cases, a PCIe endpoint may be a multi-function device, that is, a device that provides the services of multiple devices. For example, the PCIe endpoint 110c may include an Ethernet adapter, and provide a connection to a gateway device 128, such as a DSL or cable modem. The PCIe endpoint 110c may also include a storage adapter, and provide a connection to a storage device 132. The one PCIe endpoint 110c thus may provide access to a network 130, as well as access to a storage device 132. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example, by connecting daughter cards or external devices to expansion slots or external ports on the peripheral device. In some implementations, a multi-function PCI device may provide up to eight separate functions. In many implementations, the functions provided by a peripheral device may be identified by a function number. For example, Function 0 of the PCIe endpoint 110c may be a mass storage controller, while Function 1 may be a network interface.

When a computing system such as computing system 100 illustrated in FIG. 1 initially powers up, the processors 102 may be unaware of any peripheral devices that are connected to the system. The processors 102 may be aware of the root complex 104, and possibly also that the root complex 104 is connected to one or more busses. To learn about the rest of the system, the processors 102 may execute a process to scan and configure the system. This process may be referred to as an enumeration process. The specific process of scanning for, locating, and identifying peripheral devices may be called discovery or discovering. During an enumeration process, software executing on the processors 102 may first scan each of the busses 116a, 116e, 116f connected to the root complex 104, and identify the switch 108, the PCIe endpoint 110c, and the bridge 114. Upon discovering the switch 108, the processors 102 may next scan the busses 116b-116d connected to the switch 108. The processors 102 thereby discover the PCIe endpoints 110a-110c and the legacy endpoint 112a. Upon discovering the bridge 114, the processors 102 may also scan Bus 8 116g; however, the bridge 114 may translate the scanning instructions to the protocol implemented by Bus 8 116g.

While scanning the busses, or possibly after, the processors 102 may also transmit configuration transactions to each of the devices it discovers. Configuration may include, for example, assigning one or more address spaces. For example, PCI devices typically include one or more of a memory address space and/or an Input/Output (I/O) address space. Each of these address spaces may be subdivided into multiple blocks. These address spaces and address space blocks may each be assigned a base address, where the base address establishes the region of memory that is assigned to the address space. In some implementations, these base addresses may be stored in configuration registers in a configuration space included in a device. Software executing on the processors 102 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the peripheral devices. During configuration, the processors 102 may also read information from configuration registers. For example, the PCIe endpoint 110c may include a configuration register that indicates that it has two functions. The PCIe endpoint 110c may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 108 and the bridge 114 also include a configuration space with configuration registers. In such implementations, the processors 102 may discover the switch and bridge functionality by reading configuration registers in the switch 108 and the bridge 114. The switch 108 and the bridge 114 may also be configured by the processors 102, for example with bus and device numbers.

Figure 2:
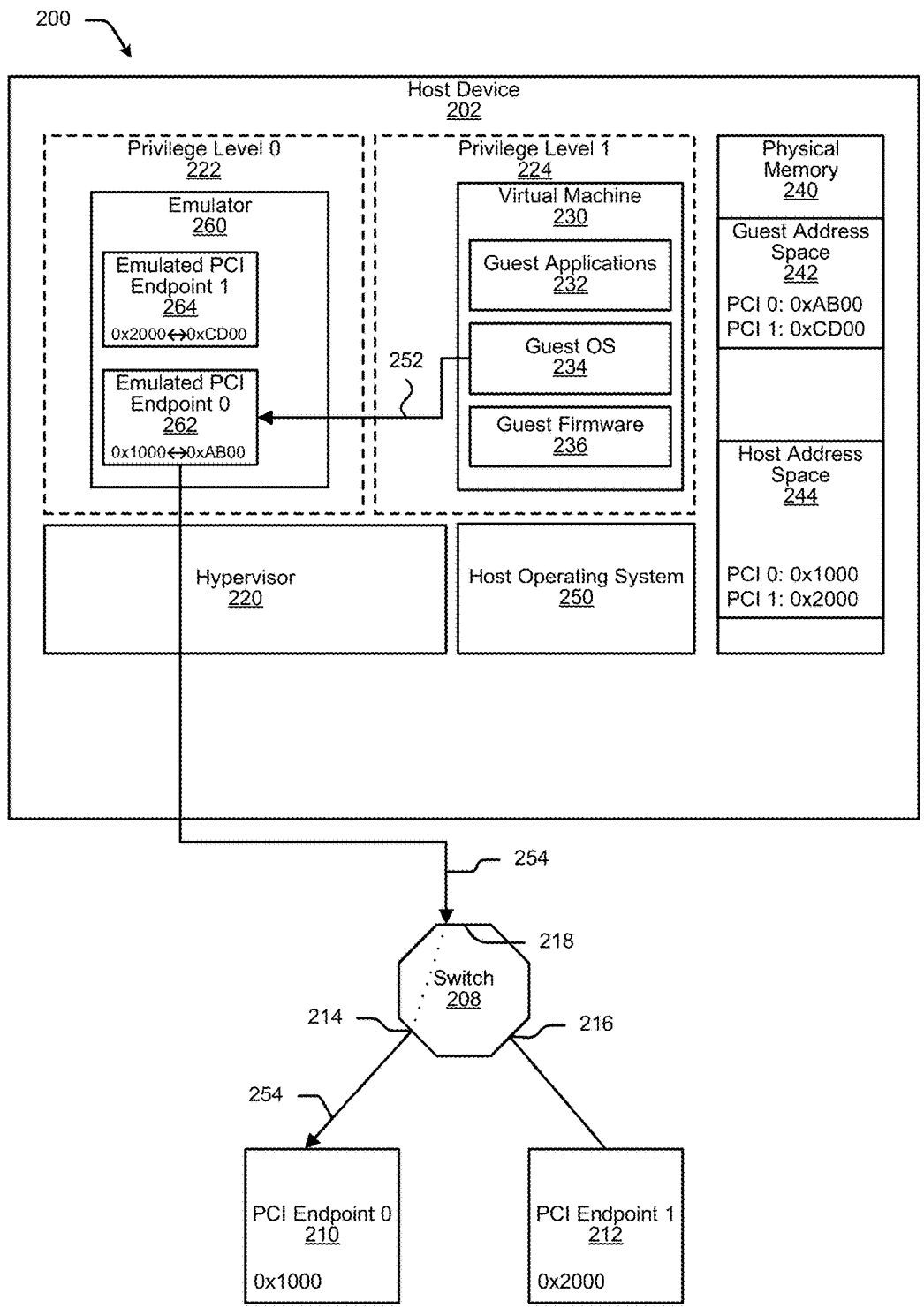
FIG. 2 illustrates an example of a virtualized computing system in which PCI peer-to-peer communication can be enabled.

FIG. 2 illustrates an example of a virtualized computing system 200 in which PCI peer-to-peer communication can be enabled. In this example computing system 200, the two PCI endpoint devices 210, 212 provide additional functionality to a host device 202. For example, the PCI endpoint devices 210, 212 can include graphics processing units (GPUs), network adapters, and/or storage interfaces, among other things. In other examples, the computing system 200 can include additional PCI endpoint devices and switches, as well as PCI bridges to other busses. The two PCI endpoints 210, 212 of the illustrated example are connected, directly or indirectly, to a switch 208. The switch 208 is connected to the host device 202, for example, by being connected to physical slot or cable that is attached to, or part of, the host device 202. In other examples, the switch 208 may be connected to the host device 202 indirectly, through a chain of one or more additional switches.

As discussed above, the switch 208 operates as multi-port connector, enabling many PCI devices to be connected to one port of the host device 202. A switch can have, for example, 2, 8, 12, 24, or more ports, any of which can be connected to a PCI endpoint, a bridge, or another switch. In the illustrated example, two PCI endpoints 210, 212 are connected to two available downstream ports 214, 216 of the switch 208. The downstream ports 214, 216 in this example are designated as "downstream" because transactions transmitted out of the downstream ports 214, 216 flow away from the host device 202. The downstream ports 214, 216 may include a physical interface for connecting to a cable, socket, port, or other connection mechanism. The downstream ports 214, 216 may further include hardware and/or software to manage incoming and outgoing transactions. In this example system 200, the PCI endpoints 210, 212 can be directly connected to the downstream ports 214, 216. In other examples, one or the other PCI endpoint 210, 212 may be indirectly connected to the switch 208. For example, PCI Endpoint 1 212 may be connected to another switch, and this other switch may be connected to the downstream port 216 of the illustrated switch 208.

A switch can internally include logical PCI-to-PCI bridges, with one bridge associated with each of the switch's ports. The bridges can be connected to a bus that is internal to the switch and that is not visible to the rest of the system 200. A switch can thus "bridge" or "route" or "switch" transactions from one of the ports of the switch to another. Each port can, similar to a bridge, have an individual set of configuration registers. The configuration registers can further include registers that define the range of addresses that are available at the port. For example, the downstream port 214 that is connected to the first of the two PCI endpoints 210 can be configured with the address range of the first PCI endpoint 210, and the downstream port 216 that is connected to the second of the two PCI endpoints 212 can be configured with the address range of the second PCI endpoint 212.

A switch generally also includes one upstream port, designated as "upstream" because the upstream port is connected, directly or indirectly, to the host device 202. Specifically, the upstream port is either connected to a root complex port, or the upstream port is connected to another switch that is closer to the root complex. In the illustrated example, the switch 208 includes an upstream port 218 connected to the host device 202. Generally, the PCI specification requires that a switch have only one upstream port.

The example computing system 200 can enable peer-to-peer communications between the attached PCI endpoints 210, 212. For various reasons, one endpoint may need to share its resources (e.g., processing, memory, networking, storage, etc.) with another endpoint. For example, each of the PCI endpoints 210, 212 may include a GPU, or a similar parallel computation device implemented (for example), in a field programmable gate array (FPGA), or a co-processor, and memory. Unlike a general purpose processor, a graphics processor is designed primarily for executing possibly thousands of simultaneous calculations. To support so many simultaneous operations, a graphics processor may have hundreds of processing cores, compared to the hundred or fewer cores that may be found in a general purpose processor. A general purpose processor, though not able to execute the number of calculations as can a graphics processor, can execute a more diverse range of operations, such as managing memory, managing hardware resources, and executing an operating system A general purpose processor can, however, offload computationally heavy loads, such as graphics rendering, to one or more GPUs, freeing the general purpose processor for other operations.

While one GPU can execute a large number of computations, two GPUs can possibly do twice the number of computations, and four GPUs can possibly do four times the number of computations. Since a GPU is typically designed to execute operations in parallel, doubling the computational capacity may be simply a matter of treating two GPUs as one resource. To do so, however, the two GPUs may need to have free access to each other's memory. For example, one GPU may produce a computational result that the other GPU uses in subsequent computations. Peer-to-peer communications can enable the GPUs to have potentially unrestricted access to each other's memory spaces and computational resources.

There may be other cases in which PCI endpoint devices may need to share resources. For example, one or more of the PCI endpoints 210, 212 in this example may be network interface cards. In this example, one PCI endpoint 210 may need to share its network connection with another PCI endpoint 212. As another example, one or more of the PCI endpoints 210, 212 may include a storage interface. In this example, to more efficiently move data, one PCI endpoint 210 may send transactions directly to another PCI endpoint 212.

Mechanisms for enabling peer-to-peer communication between the PCI endpoints 210, 212, are discussed further below.

In the example of FIG. 2, transactions to the PCI endpoints 210, 212, which may initiate peer-to-peer transactions, originate in the host device 202. In the illustrated example, the host device 202 includes a virtualized software environment and physical hardware components. The virtualized environment includes a hypervisor 220, at least one virtual machine 230, and an emulator 260 application. The host device 202 can further include a host operating system 250, on top of which the virtualized software environment runs. The hardware components include at least a physical memory 240, which provides local data storage within the host device 202. The host device 202 can include other software and hardware components, not illustrated here. For example, the host device 202 can include one or more processors, some of which can include one or more processor cores. As a further example, the host device 202 can include a root complex, with which the host device 202 can interface with a PCI device fabric.

The virtualized software environment can be configured at some point after the system 200 has been powered on and has executed hardware configuration routines. Computing systems generally include firmware, referred to as the Basic Input/Output System (BIOS), that performs hardware initialization during boot-up of the system. The BIOS is generally the first piece of software that runs when a computing system is powered on. The BIOS can, for example, initialize and test hardware components in the system, and starts the operating system.

In some implementations, the BIOS code can also include the code used to enumerate PCI devices in the system. As discussed above, enumeration can include discovering available PCI devices and assigning address ranges to each device. The base address of an address range is typically written into a configuration register of each PCI device. In the illustrated example, PCI Endpoint 0 210 has been assigned base address 0x1000, and PCI Endpoint 1 212 has been assigned base address 0x2000. The address ranges of each PCI endpoint 210, 212 can be, for example, 4 kilobytes (KB), 64 KB, 128 KB, 256 KB, 1 gigabyte (GB), or some other size.

As a final step, the BIOS usually launches the host operating system 250. In a virtualized system, the host operating system 250 may reserve a portion of the physical memory, referred to here as the host address space 244. The host operating system 250 and applications running on top of the host operating system 250 can use the host address space 244 to execute code and/or to store data that is or will be operated on. In some implementations, the address range of the host address space 244 can include the address ranges of the PCI endpoints 210, 212. For example, in a Memory-Managed I/O (MMIO) system, the host device 202 can be configured so that a host processor can read and write to the address spaces of I/O devices (e.g., the PCI endpoints 210, 212) in the same way that the host processor can read and write to the physical memory 240. In other implementations, the host operating system 250 can determine the address ranges for the PCI endpoints 210, 212 by reading configuration registers of each device.

Once the host operating system 250 is up and running, the host operating system 250 can launch the hypervisor 220 and any virtual machines, such as the illustrated virtual machine 230. A hypervisor, which may also be referred to as a virtual machine monitor, is software, firmware, and/or hardware that creates, runs, and manages virtual machines. The physical computing system on which the hypervisor 220 runs can be referred to as the "host machine" or "host device," and each virtual machine can be referred to as a "guest machine" or simply "guest." In some implementations, the hypervisor 220 launches before the host operating system 250, and the host operating system 250 runs on top of the hypervisor 220.

Among other things, the hypervisor 220 can determine the physical resources of the host device 202 that can be made available to virtual machines. In some cases, virtual machines may be allowed to only use some of the available hardware. In various implementations, the hypervisor 220 can further launch the emulator 260 application. The emulator 260 can provide virtualized versions of physical hardware, including the hardware of the host device 202 as well as hardware not included in the host device 202. The hypervisor 220 can register the hardware resources that will be available to the virtual machines with the emulator 260. The emulator 260 may read a configuration file that can, for example, enable specific drivers for specific hardware, define security levels for using specific hardware, make some hardware available while making other hardware not available, and so on. In various implementations, the configuration file can also include configuration information for hardware that is not included in a host system, so that an emulated hardware device can be created by the emulator. The emulator 260 can thereafter provide virtual machines with access to physical hardware, such as the PCI endpoints 210, 212, through emulated devices. One example of an emulator application is Quick Emulator (QEMU).

The virtualization environment maintained by the hypervisor 220 can include multiple privilege domains 222, 224. In the example of FIG. 2, the virtualization environment includes at least two privilege domains, Privilege Level 0 222 and Privilege Level 1 224. A privilege domain describes the access privileges available to applications executing within the domain. For example, applications executing in Privilege Level 0 222 may be able to access the hardware of the host device 202 directly, meaning, without having to request access through the hypervisor 220. Direct access to the host device 202 hardware can also be referred to as "native" access. In some cases, applications executing in Privilege Level 0 222 may also be able to access functions in the kernel of the host operating system. Conversely, applications executing in Privilege Level 1 224 may have no access to the hardware of the host device 202, other than through a driver program provided by the hypervisor 220.

Applications executing in Privilege Level 1 224 may also have no access to the host device's 202 operating system, other than through specific system calls provided by the hypervisor 220. In some implementations, Privilege Level 0 222 may be referred to as "Domain 0" or "Dom0" and Privilege Level 1 224 may be referred to as "DomU."

As illustrated by the example system 200, virtual machines (including the illustrated virtual machine 230) typically run in Privilege Level 1 224. Virtual machines can thus be isolated from the underlying hardware and the host operating system 250. More privileged applications typically run in Privilege Level 0 222. For example, in some implementations, the emulator 260 can access the PCI endpoints 210, 212 directly, and thus runs in Privilege Level 0 222.

A virtual machine is a software environment that is able to run an operating system, referred to as a guest operating system, and guest applications. A host device can host a number of virtual machines, and each virtual machine can be executing a different guest operating system. The guest operating system can be the same as, or different from, the operating system running on the host device. The guest operating system and the guest applications are generally software that can run directly on a host device, such as a Windows™ operating system; Mac OS™; a Linux operating system; word processing, spreadsheet, web browsing, and network applications; among other things. The guest operating system and guest applications are thus generally not designed specifically for executing in a virtual machine. Having an operating system running directly on the host device is sometimes referred to as "running natively" or "running on the bare metal."

A virtual machine presents the guest operating system and guest applications with an environment that appears, from the perspective the guest software, indistinguishable from a physical system. The virtual machine imitates physical hardware as virtual hardware, which may be the same as, or different from, the physical hardware of the host device. From the perspective of the guest operating system and guest applications, the virtual machine environment may appear indistinguishable from a physical computing system. In most configurations, the guest operating system and guest applications are unaware that they are running in a virtual machine, and are not aware of other virtual machines running on the same host device.

In the example of FIG. 2, the host device 202 includes one virtual machine 230, which has a guest operating system 234 (Guest OS) and may have a number of guest applications 232. In various implementations, the virtual machine 230 can be configured by guest firmware 236. The guest firmware 236 can initialize the virtual machine 230 such that the guest operating system 234 can run in the same fashion as if the guest operating system 234 were executing directly on the host device 202 hardware, including making physical hardware resources available to the guest operating system 234 and guest applications 232.

To configure the virtual machine 230 environment, the guest firmware 236 can provide services similar to the BIOS code but for the virtual machine 230. Such services can include determining the hardware resources available to the virtual machine 230, using a process similar to enumeration of the physical hardware. For example, the guest firmware 236 can "discover" the PCI endpoints 210, 212 by querying the emulator 260 for available hardware. The emulator 260 may further generate an emulated PCI endpoint 262, 264, one that corresponds to each of the physical PCI endpoints 210, 212. The guest firmware 236, similar to a BIOS, can assign address ranges to the emulated PCI endpoints 262, 264, and can write the base addresses of the address ranges to the emulated PCI endpoints 262, 264. These write transactions can cause the emulator 260 to generate page tables for each of the emulated PCI endpoints 262, 264. A page table can provide translations between virtual addresses and physical addresses. In the illustrated example, Emulated PCI Endpoint 0 262 has been assigned virtual base address 0xAB00, and Emulated PCI Endpoint 1 264 has been assigned virtual base address 0xCD00.

Though not illustrated here, in some implementations, page tables maintained by the emulator 260 and/or the hypervisor 220 provide address translations from guest virtual addresses to guest physical addresses, and then from guest physical addresses to host physical addresses.

The emulated PCI Endpoints 262, 264 thus have both the virtual addresses used by the guest operating system 234, and the physical addresses of the actual PCI endpoints 210, 212. As discussed further below, the emulated PCI endpoints 262, 264 can thus provide a translation from the virtual addresses of the virtual machine 230 to the physical addresses of the actual hardware.

In various implementations, the emulator 260 can provide a mechanism for sharing the PCI endpoints 210, 212, between multiple virtual machines. For example, the emulator 260 can generate a set of emulated PCI endpoints for each virtual machine that is enabled to use the physical PCI endpoints 210, 212. Each virtual machine can configure its associated emulated PCI endpoints according to its own needs. In these implementations, the hypervisor 220 may manage serializing transactions from different virtual machines that are targeting the same physical PCI endpoint. The hypervisor 220 can further manage potential conflicting transactions from different virtual machines that target the same address.

Returning to the configuration of the virtual machine 230, in various implementations, the guest firmware 236 can also request a guest address space 242 from the host device 202. The guest address space 242 is a portion of the physical memory 240 that the virtual machine 230 can use for running the guest operating system 234 and guest applications 232. The guest address space 242 thus provides a memory space for the virtual machine 230 in the same way that the physical memory 240 provides memory for the host device 202.

The guest firmware 236 can further determine a virtual address space for the virtual machine 230. As noted above, the virtual machine 230 presents a complete computing system to the guest operating system 234 and guest applications 232, including a virtual address that represents local memory. The virtual address space may bear little relationship to the physical memory or the physical addresses of I/O devices (e.g. the PCI endpoints 210, 212), other than that the virtual address space maps to actual, physical addresses in the guest address space 242. For example, the virtual address space may be continuous, while the guest address space includes multiple, non-adjacent portions of the physical memory 240. In some cases, the guest address space 242 can also include memory provided by external storage devices.

To provide an association between the virtual machine's 230 virtual addresses and the physical addresses in the host device 202, the host device 202 can include memory management functions. The memory management functions can be provided by a dedicated piece of circuitry, called a Memory Management Unit (MMU), which translates between virtual or "guest" addresses and physical addresses. In some implementations, the MMU may be part of a processor of the host device 202. In some implementations, the host operating system may alternatively or additionally provide memory management functions. In some implementations, the host operating system may extend the memory management capabilities of the hardware, such as for example by making the guest address space 242 appear larger than the actual sizes of the physical memory 240.

The guest firmware 236 can conduct further operations to configure the virtual machine 230, including determining the type of hardware the virtual machine will emulate, the type and version of the operating system to launch as the guest operating system 234, and any applications that may be launched at boot time. In various implementations, the guest firmware 236 can read a configuration file to determine information such as the hardware configuration, the guest operating system 234 type, and any additional applications to launch.

As a final step, the guest firmware 236 can launch the guest operating system 234.

In some implementations, the guest operating system 234 may move the address spaces assigned to the emulated PCI endpoints 262, 264. For example, the guest operating system 234 may determine that address ranges other than those assigned by the guest firmware 236 may be more suitable. In some implementations, the guest operating system 234 may do so through an Advanced Configuration and Power Interface (ACPI) provided by the host device 202.

In physical hardware, in some implementations the host device can include hardware and/or firmware for implementing ACPI. ACPI provides an interface through which an operating system can discover and configure hardware of the host device. For example, ACPI can define a hardware emulator table, referred to as the Differentiated System Description Table (DSDT). The hardware emulator table can include an entry for each of the physical components in the host device. To discover the hardware in the host device, the operating system can thus read the hardware emulator table. The operating system can further configure the address spaces of devices such as PCI endpoints by writing to the hardware emulator table. The hardware emulator table is typically provided by a motherboard or computing system vendor as a pre-compiled component, similar to a BIOS.

In various implementations, the guest operating system 234 may similarly write to the hardware emulator table to change the address spaces assigned to hardware devices. Since the guest operating system 234 is running within the virtual machine 230, the writes to the hardware emulator table can affect the address ranges assigned to the emulated PCI endpoints 262, 264, changing these address ranges to the ranges desired by the guest operating system 234.

Once the virtual machine 230 is fully configured and the guest operating system 234 is up and running, the guest operating system 234 can send transactions to the physical PCI endpoints 210, 212. The guest operating system 234 may send transactions for its own purposes, or on behalf of a guest application 232. To send a transaction to, for example, PCI Endpoint 0 210, the guest operating system 234 can generate a transaction 252 that will be directed to the Emulated PCI Endpoint 0 262. The transaction can be a read or a write transaction, and can be a configuration transaction, a memory transaction, or an I/O transaction. The transaction 252 has a virtual address; for example, the transaction 252 address can be 0xAB04, or the base address of Emulated PCI Endpoint 0 262 with an offset of 0x4. Upon receiving the transaction 254, Emulated PCI Endpoint 0 262 can translate the virtual address to a physical address, for example translating 0xAB04 to 0x1004, or the base address of PCI Endpoint 0 210 with an offset of 0x4. The Emulated PCI Endpoint 0 262 may then send a transaction 254, which includes the translated address, out of the host device 202. In the illustrated example, the transaction 254 will be received by the switch 208. The switch 208 can determine that the translated address is associated with one downstream port 214, and will send the transaction through this downstream port 214. The transaction 254 then reaches PCI Endpoint 0 210.

Any response from PCI Endpoint 0 210 would be sent up through the switch 208 to the Emulated PCI Endpoint 0 262. Emulated PCI Endpoint 0 262 would execute any necessary address translation from physical addresses to virtual addresses, and transfer the response to the guest operating system 234.

In the example system 200 of FIG. 2, the physical hardware of the host device 202, including the PCI endpoints 210, 212, is shared by any virtual machines executing on the host device 202. Sharing the hardware enables the virtual machines to have access to the hardware, but may create some inefficiency. For example, though multiple virtual machines can behave as if they have exclusive use of the PCI endpoints 210, 212, in reality, transactions from different virtual machines cannot be executed by a PCI endpoint at the same time. The transactions may need to be serialized, with one transaction possibly having to wait until a previous transaction has completed. A transaction may thus take longer to complete than when the guest operating system 234 has direct or native access to the PCI endpoints 210, 212.

In some cases, it may not be necessary to share the hardware of the host device 202 between multiple virtual machines. For example, in the example system 200, there may be only one virtual machine 230, or only one virtual machine that needs to access the PCI endpoints 210, 212. In these cases, the system 200 can be configured so that the virtual machine 230 has direct and exclusive access to the PCI endpoints 210, 212.

Figure 3A:
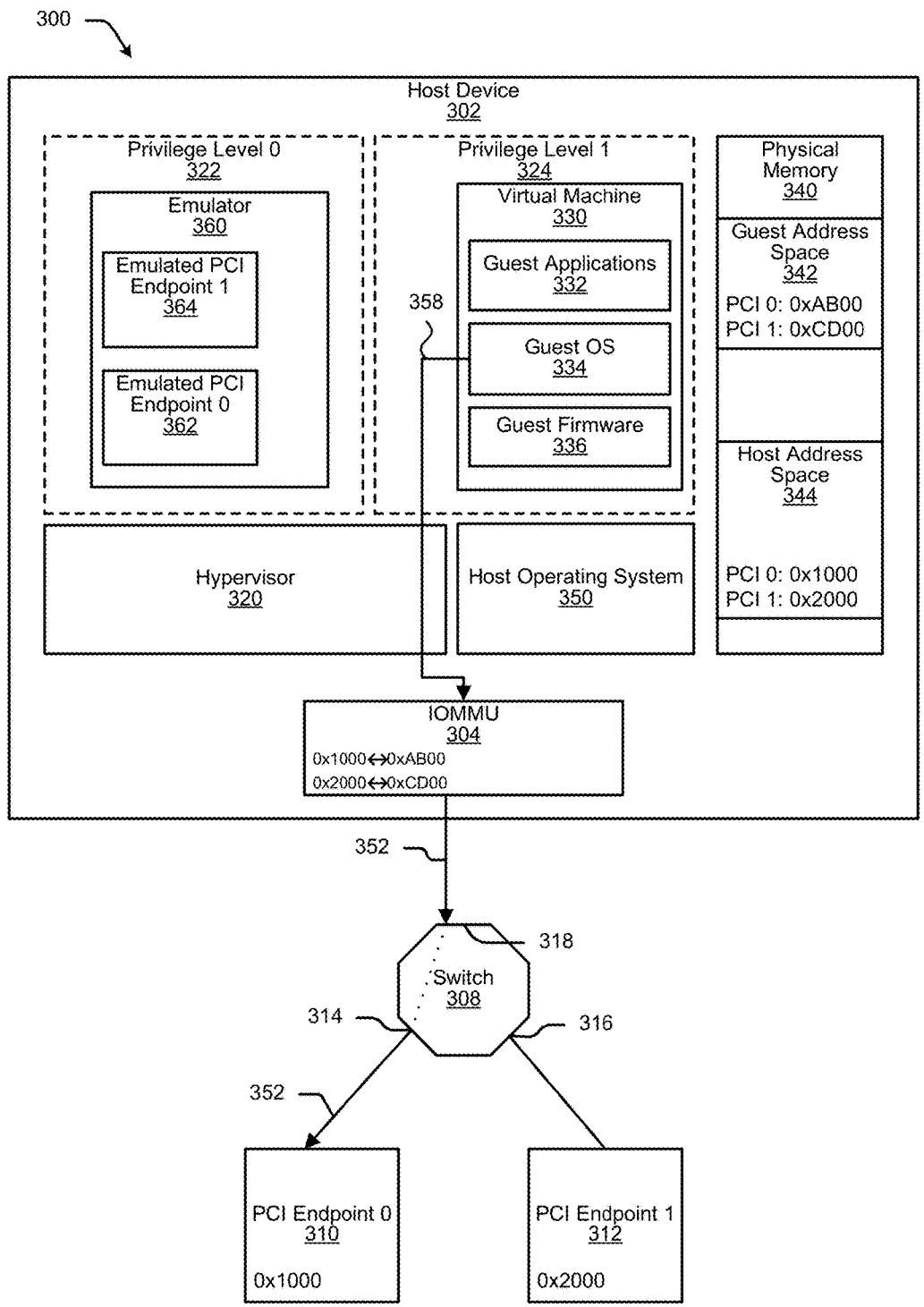
FIGS. 3A-3B illustrate an example virtualized computing system where a virtual machine has direct access to two PCI endpoint devices.
Figure 3B:
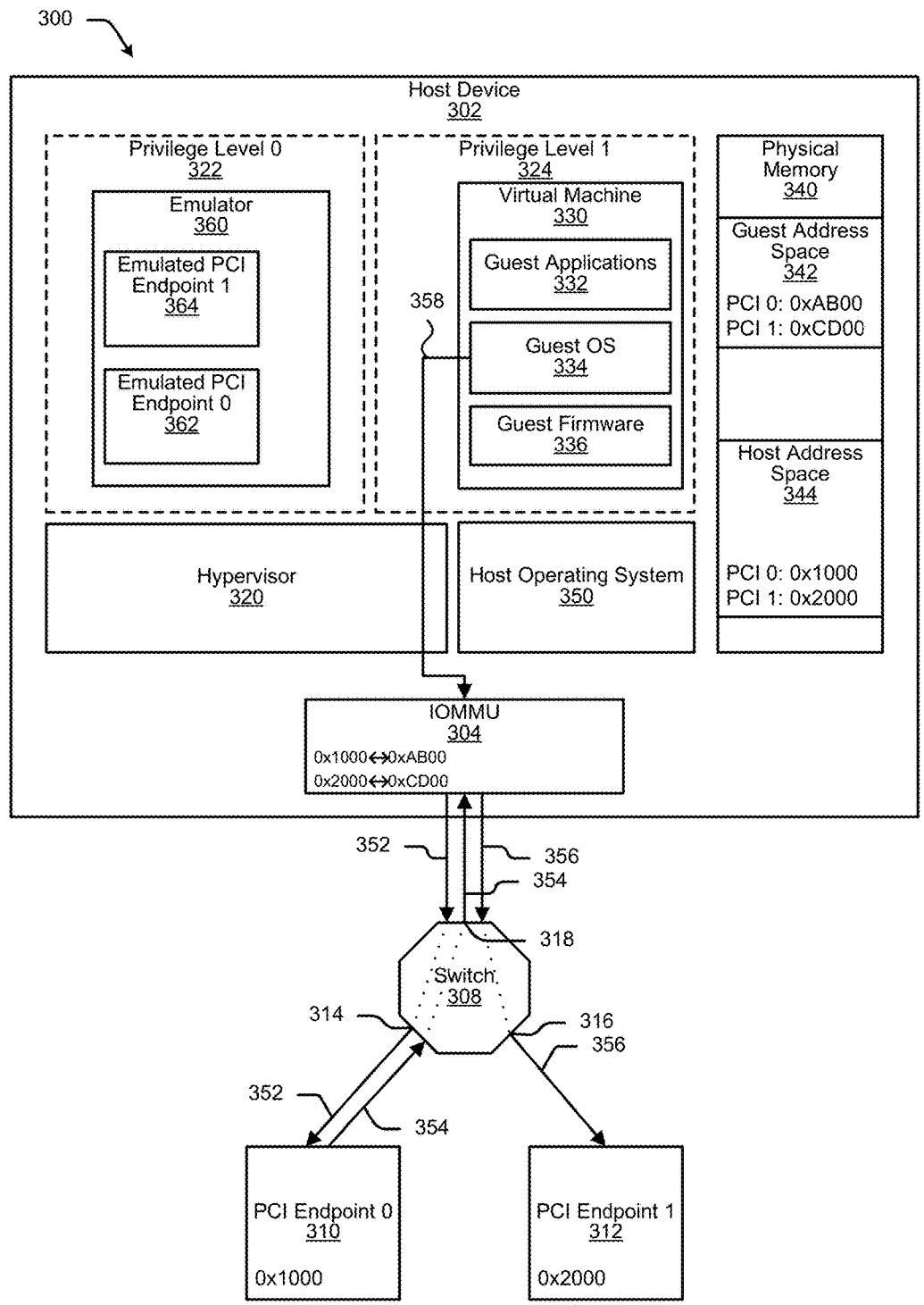

FIGS. 3A-3B illustrate an example virtualized computing system 300 where a virtual machine 330 has direct access to two PCI endpoint devices 310, 312. Direct access is also referred to as "passthrough" or "passthrough mode" because transactions pass through the hypervisor 320 without any assistance from the hypervisor 320.

In this example computing system 300, the two PCI endpoint devices 310, 312 provide additional functionality to a host device 302. In other examples, the computing system 300 can include additional PCI endpoint devices and switches, as well as PCI bridges to other busses. The two PCI endpoints 310, 312 of the illustrated example are each connected, directly or indirectly, to a downstream port 314, 316 of a switch 308. The switch's 308 upstream port 318 is connected to the host device 302, for example by being connected to a physical slot or cable that is attached to or part of the host device 302. In other examples, the switch 308 may be connected to the host device 302 indirectly, through a chain of one or more additional switches.

In the illustrated example, the host device 302 includes a virtualized software environment and physical hardware components. The virtualized environment includes a hypervisor 320, at least one virtual machine 330, and an emulator 360 application. In some implementations, the virtualized environment runs on top of a host operating system 350, which runs directly on the hardware of the host device 302. In some implementations, the hypervisor 320 runs directly on the hardware, and the host operating system 350 runs on top of the hypervisor 320. The hardware components include at least a physical memory 340. The host device 302 also includes an Input/Output Memory Management Unit (IOMMU) 304, which may be a hardware, firmware, and/or software component. The host device 302 can include other software and hardware components, not illustrated here. For example, the host device 302 can include one or more processors, some of which can include one or more processor cores. As a further example, the host device 302 can include a root complex, with which the host device 302 can interface with a PCI device fabric.

In the example of FIGS. 3A-3B, the host device 302 includes one virtual machine 330, which has a guest operating system 334 (Guest OS) and may have a number of guest applications 332. The virtual machine 330 also includes guest firmware 336, which can be used in the set up and initialization of the virtual machine 330. Specifically, the guest firmware 336 can include virtual BIOS functionality for the virtual machine 330. The guest firmware 336 can initialize the virtual machine 330 such that the guest operating system 334 can run in the same fashion as if the guest operating system 334 were executing directly on the host device 302 hardware. For example, the guest firmware 336 can request the generation of emulated PCI endpoints 262, 264 that represent the physical PCI endpoints 310, 312 to the applications in the virtual machine 330. The guest firmware 336 can also launch the guest operating system 334.

The virtualization environment maintained by the hypervisor 320 can include a Privilege Level 0 322, for more privileged applications such as the emulator 360, and a Privilege Level 1 324 for less privileged applications, such as the virtual machine 330. Applications executing in Privilege Level 0 322 may be able to access the hardware of the host device 302 directly, meaning, without having to request access through the hypervisor 320. In some cases, applications executing in Privilege Level 0 322 may also be able to access functions in the kernel of the host operating system. Conversely, applications executing in Privilege Level 1 324 may have no access to the hardware of the host device 302, other than through a driver program provided by the hypervisor 320. Applications executing in Privilege Level 1 324 may also have no access to the host device's 302 operating system, other than through specific system calls provided by the hypervisor 320.

The physical memory 340 of the host device 302 can include non-volatile memory, volatile memory, or a combination of non-volatile and volatile memory. In various implementations, applications executing on the host device 302 can be allocated portions of the physical memory 340. For example, a host address space 344 can be allocated for use by the host device 302. The host address space 344 can be used, for example, to execute the host operating system 350. In an MMIO system, the host address space 344 can include the address spaces of the PCI endpoint devices 310, 312, such that the host processor can access the address spaces of the PCI endpoint devices 310, 312 directly. In the illustrated example, the first PCI endpoint device, PCI Endpoint 0 310, has a base address of 0x1000, which describes the start address of the range of addresses that can be used to access PCI endpoint 0 310. The second PCI endpoint device, PCI Endpoint 1 312, has a base address of 0x2000 (hexadecimal). Generally, the address ranges of the PCI endpoints 310, 312 do not overlap. In some cases, the address ranges are contiguous.

A guest address space 342 can also be allocated for use by the virtual machine 330. In most cases, the physical address range of the guest address space 342 is different from the virtual address space available within the virtual machine 330. Virtual addresses used by the virtual machine 330 may thus need to be translated to physical addresses in the physical memory 340. The translation can be accomplished by, for example, a memory management unit.

As discussed above, the guest operating system 334 can send transactions to the PCI endpoints 310, 312, either for its own purposes or on behalf of the guest applications 332. Because the example system 300 is configured for passthrough, transactions from the guest operating system 334 do not need to first go to an emulated PCI endpoint 362, 364, and can instead flow directly to the targeted physical PCI endpoint 310, 312.

FIG. 3A illustrates an example of a transaction 358 sent by the guest operating system 334 to PCI Endpoint 0 310. As illustrated by this example, the transaction 358 flows directly to the hypervisor 320, and does not need to first go to Emulated PCI Endpoint 0 362. The host device 302 may still have the emulated PCI endpoints 362, 364 for other purposes, but can be bypassed due to the passthrough configuration.

Though the example system 300 has been configured for passthrough access to the PCI endpoints 310, 312, the transaction 358 from the guest operating system 334 still has a virtual address, which still needs to be translated to a physical address. In various implementations, the host device 302 can include an IOMMU 304 that can be configured to translate between virtual addresses and physical addresses. The IOMMU 304 can be a physical component, such as an integrated circuit in an individual chip package, or an integrated circuit incorporated into another circuit. In some implementations, the IOMMU 304 can include firmware executing on an integrated circuit. In some implementations, functionality performed by the IOMMU 304 can be at least partially implemented in software.

In the example host device 302, the transaction 358 from the guest operating system 334 is received by the IOMMU 304. The IOMMU 304 can translate the virtual address in the transaction 358 to a corresponding physical address. The IOMMU 304 can then issue a transaction 352, which includes the physical address, to the switch 308. The switch 308 can direct this transaction 352 to PCI Endpoint 0 310. Any response from PCI Endpoint 0 310 would also go up to the IOMMU 304 for translation to the virtual address space of the virtual machine 330, before the response is sent on to the guest operating system 334.

In various implementations, the IOMMU 304 may provide additional functionality. For example, the IOMMU 304 can provide address mapping for other purposes and other hardware. As another example, the IOMMU 304 can be used to define large, continuous regions of memory that map to fragmented parts of the physical memory 340. As another example, the IOMMU 304 can extend the range of memory that can be reached by some hardware. For example, some hardware may use 32-bit addresses, and thus cannot address any memory addresses above 4 GB. In this example, the IOMMU 304 can map the 32-bit address anywhere, including above the range above 4 GB. Another example of functionality provided by the IOMMU 304 is memory isolation, which can provide robustness and security to the host device 302. Specifically, the IOMMU 304 can disallow, for example, the guest operating system 334 from reading or writing to any address that is outside of the address space allotted to the virtual machine 330. The IOMMU 304 can thus prevent a defective or malicious application from corrupting memory.

The IOMMU 304 is typically configured by the host device 302 concurrently with or after configuration of the hardware and virtualized environment. The IOMMU 304 can be, for example, programmed to map the virtual addresses for the virtual machine 330 to corresponding physical addresses in the address ranges of the PCI endpoints 310, 312.

As discussed above, in some situations, the PCI endpoints 310, 312 may share resources, such as processing, storage, networking, security services, and/or other resources. In these situations, greater efficiency can be achieved when the PCI endpoints 310, 312 are able to communicate peer-to-peer; that is, by sending transactions directly to each other. When peer-to-peer communication is not available, a transaction from, for example, PCI Endpoint 0 310 to PCI Endpoint 1 312 would first go to the host device 302. The host device 302 would then transmit the transaction to PCI Endpoint 1 312. The transaction may thus take more time to reach PCI Endpoint 1 312 than if the transaction is sent peer-to-peer. The transaction can also occupy processor time in the host device 302, which can be better used for other operations.

The two PCI endpoints 310, 312 can use mechanisms provided by the PCI standard for peer-to-peer communications. Specifically, in a non-virtualized system, the switch 308 can route transactions from PCI Endpoint 0 310 to PCI Endpoint 1 312. More specifically, PCI Endpoint 0 310 can be made aware of the address range of PCI Endpoint 1 312, for example, by the address range being programmed into PCI Endpoint 0 310 by the host device 302 (e.g., PCI Endpoint 0 310 can be provided with the base address 0x2000). PCI Endpoint 0 310 can then generate a transaction that includes an address from the address range of PCI Endpoint 1 312 (e.g., address 0x2004). When the switch 308 receives this transaction from PCI Endpoint 0 310, the switch 308 can determine that the transaction address is associated with the downstream port 316 to which PCI Endpoint 1 312 is connected. The switch 308 can then send the transaction out through this downstream port 316.

In a virtualized system, however, such as the system 300 illustrated in FIGS. 3A-3B, a peer-to-peer transaction between the PCI endpoints 310, 312 can include additional steps. In the system 300, the guest operating system 334 can program PCI Endpoint 0 310 with the base address of PCI Endpoint 1 312. But since the guest operating system 334 operates within the virtual address space of the virtual machine, the guest operating system 334 will program PCI Endpoint 0 310 with virtual addresses, and not physical addresses.

FIG. 3B illustrates an example of a peer-to-peer transaction 354 from PCI Endpoint 0 310 to PCI Endpoint 1 312. PCI Endpoint 0 310 may have sent the transaction 354 to PCI Endpoint 1 312 to, for example, read a value from or write a value to a memory of PCI Endpoint 1 312, or to provide an instruction to PCI Endpoint 1 312, or for some other purpose. PCI Endpoint 1 312 can similarly send peer-to-peer transactions to PCI Endpoint 0 310.

For peer-to-peer transactions to be enabled, in the illustrated example, PCI Endpoint 0 310 needs to have the address range of PCI Endpoint 1 312 to be able to determine an address for the peer-to peer transaction 354. In this example, the guest operating system 334 can configure PCI Endpoint 0 310 with the address range (or with specific addresses from the address range) of PCI Endpoint 1 312. For example, the guest operating system 334 can send a write transaction 358 to PCI Endpoint 0 310. As discussed above, the guest operating system 334 operates in a virtual address space, hence the transaction 358 to PCI Endpoint 0 310 will have a virtual address (e.g., 0xAB04). Since the system 300 is configured for passthrough access to PCI Endpoint 0 310, the transaction 358 passes through the hypervisor 320 and is received by the IOMMU 304. The IOMMU 304 can translate the virtual address of the transaction 358 into a physical address (e.g., from 0xAB04 to 0x1004). The host device 302 can then generate a write transaction 352 that includes the physical address.

The value being written to PCI Endpoint 0 310 with this write transaction 352 will also be a virtual address. For example, the write transaction 352 may be writing the base address of PCI Endpoint 1 312 to PCI Endpoint 0 310, for PCI Endpoint 0 310 to use to determine addresses for peer-to-peer transactions. In the illustrated example, the guest operating system 334 has only the virtual base address for PCI Endpoint 1 312 (e.g., 0xCD00), and since this virtual base address is provided as a value in the transaction 358 from the guest operating system 334, the address will not be translated by the IOMMU 304.

PCI Endpoint 0 310 is thus configured with virtual addresses for PCI Endpoint 1 312. When PCI Endpoint 0 310 generates the peer-to-peer transaction 354 to PCI Endpoint 1 312, the transaction will use a virtual address for PCI Endpoint 1 312 (e.g., CD08).

When the switch 308 receives the transaction 354 from PCI Endpoint 0 310, the switch 308 may be configured to send the transaction 354 to the host device 302. In some cases, the switch 308 may send the transaction 354 to the host device 302 because the switch 308 cannot identify, based on the address, a destination for the transaction 354. In some cases, the switch 308 may be configured to send the transaction 354 to the host device 302 even when the switch 308 can identify PCI Endpoint 1 312 as the target for the transaction 354. The behavior of the switch 308 (e.g., whether the switch 308 always sends peer-to-peer transactions to the host device 302) may be configurable. For example, the switch 308 may include Access Control Services (ACS) that can control whether peer PCI endpoints can send transactions directly to each other. Access Control Services can prevent direct communication between PCI endpoints, for example, to prevent one PCI endpoint from sending incompatible or malicious transactions to another PCI endpoint.

In the host device 302, the transaction 354 from PCI Endpoint 0 310 can be provided to the IOMMU 304 for translation into a physical address (e.g., 0x2008). The host device 302 can subsequently generate a transaction 356 that includes this physical address. The switch 308 can subsequently route the transaction 356 to PCI Endpoint 1 312.

As illustrated in the example of FIG. 3B, in a virtualized system, such as the example system 300, peer-to-peer transactions between PCI endpoints can incur overhead, due to the translation between virtual and physical addresses. When the system 300 executes few peer-to-peer transactions, this overhead may not be consequential. When the system 300 executes many peer-to-peer transactions, however, address translations in the IOMMU 304 can become a bottleneck, such that the PCI Endpoints 310, 312 may not be able to operate at peak efficiency.

Figure 4:
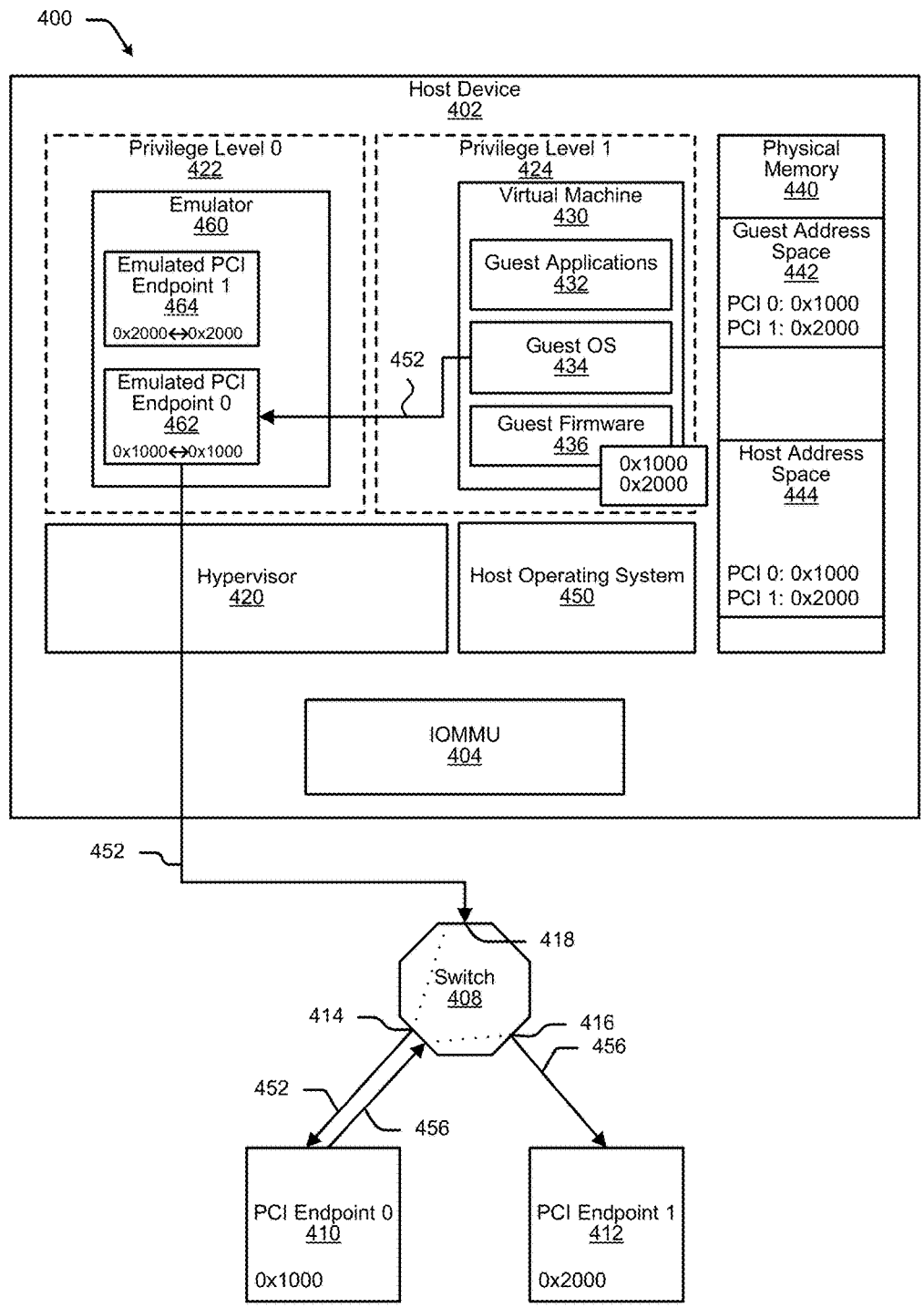
FIG. 4 illustrates an example of a virtualized computing system in which peer-to-peer communications can be enabled and the IOMMU 404 can be bypassed.

In various implementations, the address translation bottleneck can be removed by removing the need for address translations. FIG. 4 illustrates an example of a virtualized computing system 400 in which peer-to-peer communications can be enabled and the IOMMU 404 can be bypassed. This example computing system 400 includes a host device 402 connected to two PCI endpoint devices 410, 412. In other examples, the computing system 400 can include additional PCI endpoint devices and switches, as well as PCI bridges to other busses. The two PCI endpoints 410, 412 of the illustrated example are each connected, directly or indirectly, to a downstream port 414, 416 of a switch 408. The switch's 408 upstream port 418 is connected to the host device 402. In other examples, the switch 408 may be connected to the host device 402 indirectly, through a chain of one or more additional switches.

In the illustrated example, the host device 402 includes a virtualized software environment and physical hardware components. The virtualized environment includes a hypervisor 420, at least one virtual machine 430, and an emulator 460 application. In some implementations, the virtualized environment runs on top of the host operating system 450. In some implementations, the hypervisor 420 runs directly on the hardware of the host device 402 and the host operating system 450 runs on top of the hypervisor 420. The hardware components include at least a physical memory 440. The host device 402 may also include an IOMMU 404. The host device 402 can further include, for example, one or more processors, not illustrated here. As another example, the host device 402 can include a root complex, with which the host device 402 can interface with a PCI device fabric.

In the example of FIG. 4, the host device 402 includes one virtual machine 430, which has a guest operating system 434 (Guest OS) and may have a number of guest applications 432. The virtual machine 430 also includes guest firmware 436, which can be used in the set up and initialization of the virtual machine 430.

The virtualization environment maintained by the hypervisor 420 can include a Privilege Level 0 422, for more privileged applications such as the emulator 460, and a Privilege Level 1 424 for less privileged applications, such as the virtual machine 430.

The physical memory 440 of the host device 402 can include non-volatile memory, volatile memory, or a combination of non-volatile and volatile memory. In this example, a host address space 444 has been allocated in the physical memory 440 for use by the host device 402. A guest address space 442 has also been allocated for use by the virtual machine 430. While the guest address space 442 has physical addresses in the physical memory 440, the guest operating system 434 and the guest applications 432 access the guest address space 442 using virtual addresses. Generally, the host device 402 includes memory management functions to translate between the virtual addresses and the physical addresses.

In the example system 400, peer-to-peer communications between the PCI endpoint devices 410, 412 have been enabled. Additionally, the system 400 has been configured such that the virtual-to-physical and physical-to-virtual address translations are not needed, and the IOMMU 404 can be bypassed.

To enable peer-to-peer communication between the PCI endpoints 410, 412 and also bypass the IOMMU 404, the guest operating system 434 can be configured to use virtual addresses for the PCI endpoints 410, 412 that are the same as the physical address assigned by the system 400. Various techniques can be used to have the guest operating system 434 use the physical addresses of the PCI endpoints 410, 412. For example, as discussed above, when the guest firmware 436 initializes the virtual machine 430, the guest firmware 436 can determine and configure virtual address ranges that the guest operating system 434 can use to access the PCI endpoints 410, 412. In various implementations, rather than allowing the guest firmware 436 to independently determine the virtual address ranges for the emulated PCI endpoints 462, 464, the guest firmware 436 can be hardcoded to use the physical addresses assigned to the physical PCI endpoints 410, 412.

In some systems, the base addresses assigned to the PCI endpoints 410, 412 can be predictable and deterministic. For example, in some systems, the host device 402 enumeration process always assigns a particular base address to a PCI device plugged into a specific slot. Additionally, the particular PCI devices plugged into each slot may be expected to not change (e.g., the device in slot 0 is expected to be, for example, a video card each time the system powers on). In these systems, the base addresses assigned to the PCI Endpoints 410, 412 (e.g. 0x1000 and 0x2000 in the example of FIG. 4) can be pre-populated into the guest firmware 436, and the guest firmware 436 can be compiled with these addresses. Thus, when the guest firmware 436 sets up the virtual machine 430, the guest firmware 436 can be made to use the physical addresses of the physical PCI endpoints 410, 412 when configuring virtual address spaces for these devices.

Specifically, as discussed above, the guest firmware 436 can determine and configure virtual address spaces for the emulated PCI endpoints 462, 464. In the illustrated example, the guest firmware 436 can still determine virtual address spaces, but, by being hardcoded with the physical addresses of the PCI endpoints 410, 412, the guest firmware 436 will determine to use the physical addresses (e.g., 0x1000 for PCI Endpoint 0 410 and 0x2000 for PCI Endpoint 1 412) as the virtual base addresses. Thus, when the guest firmware 436 configures the emulated PCI endpoints 462, 464, the emulated PCI endpoints 462, 464 will be assigned the physical addresses as base addresses.

The guest operating system 434 can thereafter configure the PCI endpoints 410, 412 for peer-to-peer transactions. For example, the guest operating system 434 can send a write transaction 352 to Emulated PCI Endpoint 0 462 that includes, as write data, an address or addresses in the address space of Emulated PCI Endpoint 1 464. As provided above, Emulated PCI Endpoint 1 464 is configured with the physical address of PCI Endpoint 1 412, and thus the value in the write transaction 452 is a physical address in the address space of PCI Endpoint (e.g., 0x2008). As also provided above, Emulated PCI Endpoint 0 462 is configured to map the address it receives for the guest operating system 434 back to itself, so that the outbound transaction 452 includes a physical address (e.g., 0x1004) as the target address. Because the outbound transaction 452 has a physical address, the transaction 452 can bypass the IOMMU 404, and go directly to the switch 408.

Having been configured with one or more addresses in the physical address range of PCI Endpoint 1 412, PCI Endpoint 0 410 can generate peer-to-peer transactions to PCI Endpoint 1 412 that do not need address translations. For example, PCI Endpoint 0 410 can generate a transaction 456 to read or write a value to PCI Endpoint 1 412. Because the transaction 456 has a physical address, the transaction 456 can be sent by the switch 408 directly to PCI Endpoint 1 412.

In the above example, the transaction 452 from the guest operating system 434 may, in some implementations, still go first to the IOMMU 404 before being sent from the host device 402. The IOMMU 404, however, can be configured to not translate the address in the transaction 452, or to map the address back to itself.

In some implementations, the switch 408 may need to be configured to enable peer-to-peer communications between the PCI endpoints 410, 412. For example, as noted above, some switches implement Access Control Services, which can be used to isolate PCI endpoints from each other. In this example, the peer-to-peer transaction 456 from PCI Endpoint 0 410 would be sent by the switch 408 to the host device 402, rather than directly to PCI Endpoint 1 412. In this example, Access Control Services can be disabled so that the switch 408 can send the peer-to-peer transaction 456 directly to PCI Endpoint 1 412.

While hardcoding the physical addresses of the PCI endpoints 410, 412 into the guest firmware 436 provides one solution for bypassing address translations, doing so may have some limitations. For example, different systems or platforms may use different base addresses for the PCI endpoints connected to the system (e.g., a motherboard made by Intel® may use different addresses than a motherboard made by AMD®). For these systems, it may be necessary to compile different versions of the guest firmware, where each version is hardcoded with the base addresses used by a particular system. As another example, in some systems, the base addresses assigned to PCI endpoints may be assigned in a dynamic fashion, in which case the addresses may not be predictable. In these systems, it may not be possible to hardcode the physical addresses into the guest firmware.

Figure 5A:
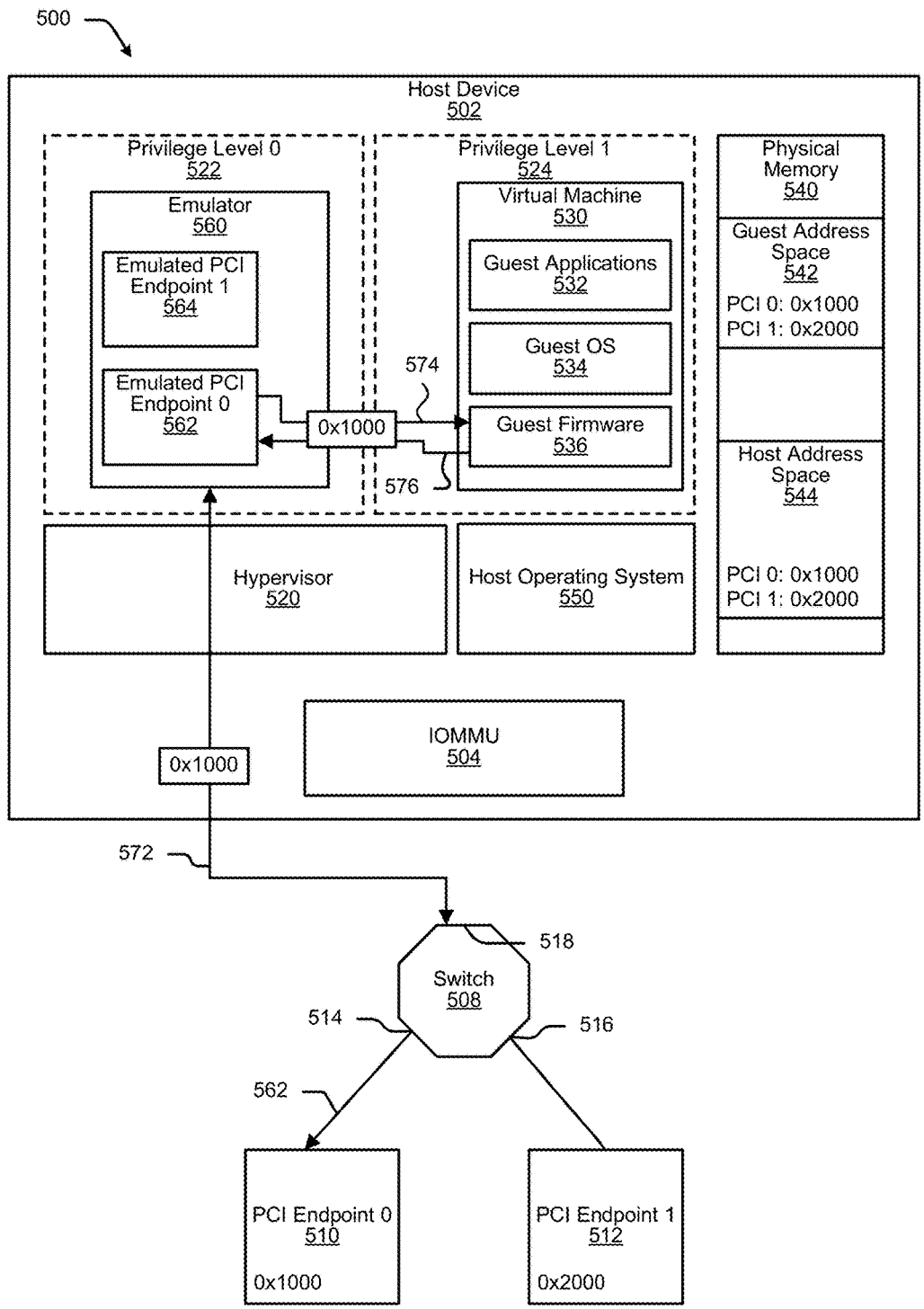
FIGS. 5A and 5B illustrate an example where a system is configured for peer-to-peer communications without relying on hardcoded physical addresses, and without requiring address translations.
Figure 5B:
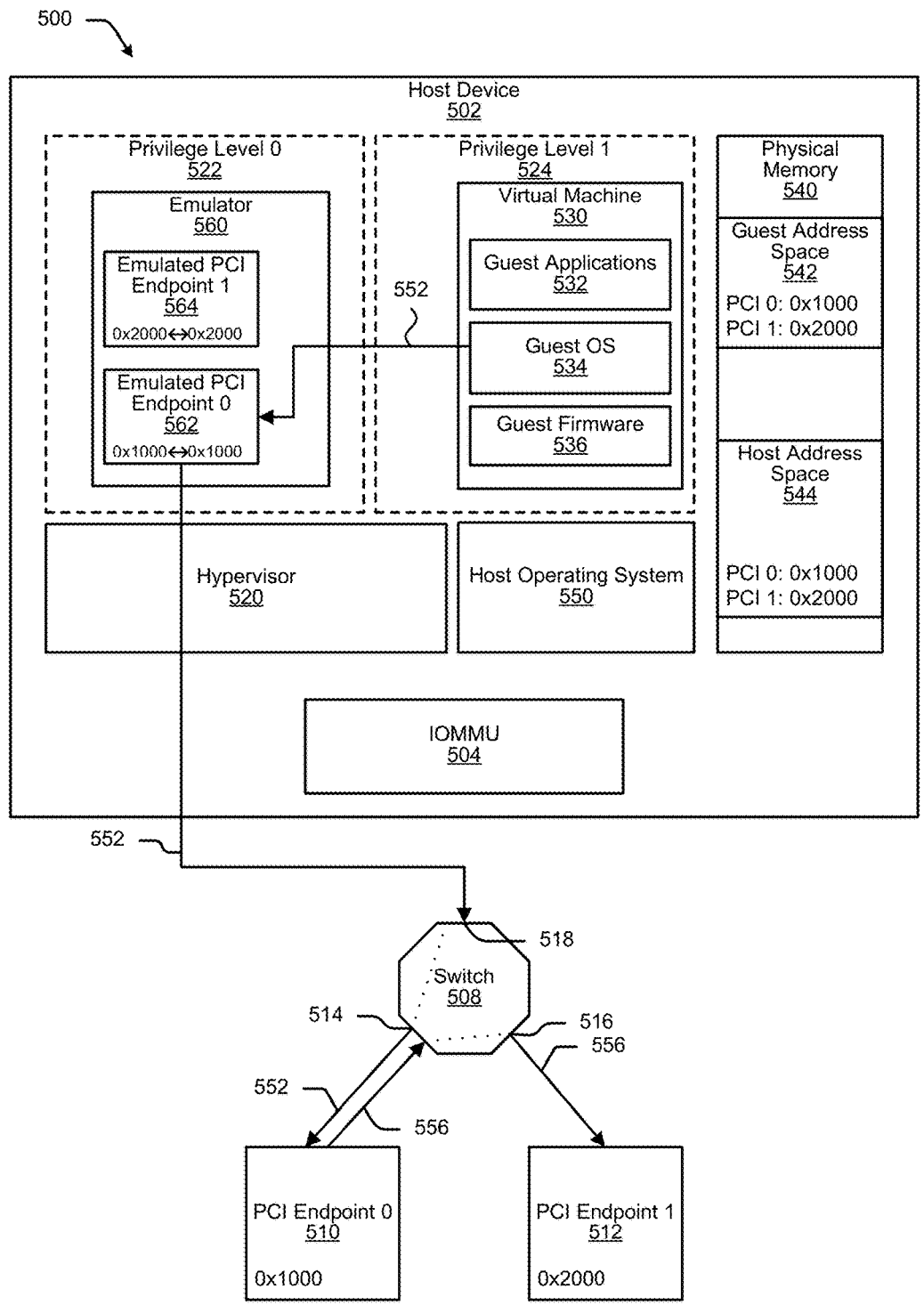

A portable and more flexible technique for configuring a system for peer-to-peer transactions that avoid address translations configures the system in a dynamic fashion, rather than relying on hardcoded addresses. FIGS. 5A and 5B illustrate an example where a system 500 is configured for peer-to-peer communications without relying on hardcoded physical addresses, and without requiring address translations. In various implementations, the configuration technique illustrated in FIG. 5A can be used on different platforms, without needing to recompile any code. In various implementations, the configuration technique includes an emulator 560 capable of obtaining the physical addresses assigned to the PCI endpoints 510, 512, and a guest firmware 536 that is capable of providing the physical addresses to the virtual machine 530.

In the example of FIGS. 5A-5B, the computing system 500 includes a host device 502 connected to two PCI endpoint devices 510, 512. In other examples, the computing system 500 can include additional PCI endpoint devices and switches, as well as PCI bridges to other busses. The two PCI endpoints 510, 512 of the illustrated example are each connected, directly or indirectly, to a downstream port 514, 516 of a switch 508. The switch's 508 upstream port 518 is connected to the host device 502. In other examples, the switch 508 may be connected to the host device 502 indirectly, through a chain of one or more additional switches.

In the illustrated example, the host device 502 includes a virtualized software environment and physical hardware components. The virtualized environment includes a hypervisor 520, at least one virtual machine 530, and an emulator 560 application. In some implementations, the virtualized environment runs on top of the host operating system 550. In some implementations, the hypervisor 520 runs directly on the hardware of the host device 502, and the host operating system 550 runs on top of the hypervisor 520. The hardware components include at least a physical memory 540. The host device 502 may also include an IOMMU 504. The host device 502 can further include, for example, one or more processors, not illustrated here. As another example, the host device 502 can include a root complex, with which the host device 502 can interface with a PCI device fabric.

In the example of FIG. 5, the host device 502 includes one virtual machine 530, which has a guest operating system 534 (Guest OS) and may have a number of guest applications 532. The virtual machine 530 also includes guest firmware 536, which can be used in the set up and initialization of the virtual machine 530.

The virtualization environment maintained by the hypervisor 520 can include a Privilege Level 0 522, for more privileged applications such as the emulator 560, and a Privilege Level 1 524 for less privileged applications, such as the virtual machine 530.

The physical memory 540 of the host device 502 can include non-volatile memory, volatile memory, or a combination of non-volatile and volatile memory. In this example, a host address space 544 has been allocated in the physical memory 540 for use by the host device 502. A guest address space 542 has also been allocated for use by the virtual machine 530. While the guest address space 542 has physical addresses in the physical memory 540, the guest operating system 534 and the guest applications 532 access the guest address space 542 using virtual addresses. Generally, the host device 502 includes memory management functions to translate between the virtual addresses and the physical addresses.

In the example of FIGS. 5A-5B, when the system 500 is configured after being powered on or rebooted, the system 500 can dynamically configure the virtual addresses used by the virtual machine 530 so that the virtual machine 530 uses the physical addresses of the PCI endpoints 510, 512, instead of virtual addresses that are different from the physical addresses. FIG. 5A illustrates steps that can occur in this configuration process. When the host device 502 powers on, the host device 502 (using, for example, BIOS code) can discover and configure the PCI endpoints 510, 512. Configuring the PCI endpoints 510, 512 can include determining address ranges for each PCI endpoint 510, 512. In this example, PCI Endpoint 0 510 is assigned base address 0x1000 and PCI Endpoint 1 512 is assigned to base address 0x2000. The host device 502 can then start the host operating system 550.

The host operating system 550 can start the hypervisor 520 and the emulator 560. In various implementations, when the emulator 560 launches, it may read a configuration file to determine, for example, which hardware resources to make available to virtual machine, to determine the configuration for emulated hardware components, and so on. The configuration file can include a flag or indicator that informs the emulator 560 that the system 500 is being configured for peer-to-peer communication. When the indicator is set to indicate that the system 500 is not being configured for peer-to-peer communication, the emulator 560 can proceed as normal, and, once the system 500 is operational, the system 500 will function as described with respect to FIG. 2.

When the indicator is set to indicate that the system 500 of FIG. 5A is being configured for peer-to-peer communication, the emulator 560 can read physical addresses from the PCI endpoints 510, 512. As noted above, because the emulator 560 runs in Privilege Level 0 522, the emulator 560 can access hardware components of system 500. Thus, for example, the emulator 560 can send a read transaction 572 to PCI Endpoint 0 510 to read the base address assigned to PCI endpoint 0 510 by the host device 502. In the illustrated example, the base address is 0x1000. The emulator 560 can similarly read a base address from PCI Endpoint 1 512.

The emulator 560 can further configure emulated PCI endpoints 562, 564, as the emulator 560 would whether or not the system were being configured for peer-to-peer communications. As discussed above, the guest firmware 536 can later determine virtual address spaces for the emulated PCI endpoints 562, 564, and can write base addresses for those virtual address spaces to the emulated PCI endpoints 562, 564. The emulated PCI endpoints 562, 564 may have emulated registers for storing the base addresses. In the example of FIG. 5A, however, the emulator 560 can write the physical addresses that the emulator 560 read from the physical PCI endpoints 510, 512. As discussed further below, doing so can prevent the guest firmware 536 from itself writing virtual addresses to the emulated PCI endpoints 562, 564.

After the emulator 560 is configured, the virtual machine 530 can be launched. As discussed above, the guest firmware 536 can be launched to initialize the environment of the virtual machine 530. In the illustrated example, before determining virtual address spaces for the emulated PCI endpoints 562, 564, the guest firmware 536 can read 574 the base addresses stored in the emulated PCI endpoints 562, 564. When the emulator 560 has not been instructed to enable peer-to-peer communications, the emulator 560 will not have written physical addresses as base addresses for the emulated PCI endpoints 562, 564. Instead, the emulated registers in the emulated PCI endpoints 562, 564 may contain all zeros, or some invalid value that can indicate to the guest firmware 536 that the emulated registers have not been written to. In this situation, the guest firmware 536 can determine to configure virtual address spaces for the emulated PCI endpoints 562, 564.

When the emulator 560 has been instructed to enable peer-to-peer communications, as discussed above, the emulated registers in the emulated PCI endpoints 562, 564 will contain valid values. In this situation, the guest firmware 536 can read 574 the values from the emulated registers, and thus read the physical addresses that have been assigned to the physical PCI endpoints 510, 512. Finding valid values in the emulated registers can inform the guest firmware 536 that the system 500 is being configured for peer-to-peer communications. In some implementations, the guest firmware 536 may skip the process of determining virtual address spaces for the emulated PCI endpoints 562, 564.

In some implementations, the guest firmware 536 may instead verify the addresses the guest firmware 536 read from the emulated PCI endpoints 562, 564. For example, the guest firmware 536 may verify whether the addresses are within a range that can be addressed by the guest operating system 534. As another example, when the virtual machine 530 is configured as an MMIO system, the guest firmware 536 may verify whether the addresses can be included in in the guest address space 542. As another example, the guest firmware 536 can confirm that the addresses do not conflict with virtual addresses that will be used within the virtual machine 530. In this example, when the addresses do conflict, the guest firmware 536 may attempt to change the virtual addresses assigned to devices other than the emulated PCI endpoints 562, 564.

When the address verification fails, the guest firmware 536 can signal to the system 500 that the system 500 cannot be configured for peer-to-peer communication. In this situation, the system 500 configuration may fail, and the system 500 may, for example, enter a static fail state or may shut down. Alerts can be sent to a system administrator to make corrections to the system configuration, and can then restart the system 500.

When the address verification passes, the guest firmware 536 can write 576 the physical addresses back to the emulated PCI endpoints 562, 564. This write 576 is similar to the write that the guest firmware 536 would issue when the guest firmware 536 determines and configures virtual addresses for the emulated PCI endpoints 562, 564. In this case, however, the guest firmware 536 writes 576 back the addresses that the guest firmware 536 read 574 earlier. This write can cause the emulator 560 to initialize page tables, which are ordinarily used to translate virtual addresses from the virtual machine 530 to the physical addresses of the PCI endpoints 510, 512. In the example of FIG. 5A, however, the virtual addresses in the page table are populated with the physical addresses read from the PCI endpoints 510, 512. The page tables are still used, but instead of translating virtual addresses to physical addresses, the page tables map physical addresses back to physical addresses.

Though not illustrated here, in some implementations, page tables maintained by the emulator 560 and/or the hypervisor 520 provide address translations from guest virtual addresses to guest physical addresses, and then from guest physical addresses to host physical addresses. In these implementations, the physical addresses of the PCI endpoints 210, 212 can be written into a page table that provides translation from guest physical addresses to host physical addresses, as guest physical addresses. The host physical addresses will also be the physical addresses of the PCI endpoints 210, 212, such that the guest physical address to host physical address transaction translates the an address back to itself.

FIG. 5B illustrates an example of a peer-to-peer transaction 556 from PCI Endpoint 0 510 to PCI Endpoint 1 512, after the system 500 has been configured as discussed above. The guest operating system 534 may first configure PCI Endpoint 0 510 with addresses in the address range of PCI Endpoint 1 512. For example, the guest operating system 334 can send a write transaction 552 to Emulated PCI Endpoint 0 562. Because Emulated PCI Endpoint 0 562 was configured with the physical address of PCI Endpoint 0 510 (e.g., 0x1004), Emulated PCI Endpoint 0 562 will output a transaction 552 that can go directly to PCI Endpoint 0 510, without needed address translation in the IOMMU 504.

In the illustrated example, the value being written by the write transaction 552 is an address of PCI Endpoint 1 512, being written to PCI Endpoint 0 510 so that PCI Endpoint 0 510 can use the address for peer-to-peer transactions. The guest operating system 534 would have sent a virtual base address for Emulated PCI Endpoint 1 564, but since Emulated PCI Endpoint 1 564 was configured with the physical address of PCI Endpoint 1 512, the guest operating system 534 instead sends the physical base address of PCI Endpoint 1 512 (e.g., 0x200). Thus, when PCI Endpoint 0 510 generates a peer-to-peer transaction to PCI Endpoint 1 512, PCI Endpoint 0 510 can use a physical address (e.g., 0x2008). The switch 408 can route this transaction directly to PCI Endpoint 1 512. As noted above, in some cases, the switch 408 can be configured to allow a transaction to be transferred within the switch 408, instead of the transaction first having to go to the host device 502. For example, Access Control Serves can be disabled.

As discussed above, in some implementations, the guest operating system 534 may assign different address spaces to the emulated PCI endpoints 562, 564. For example, the guest operating system 534 may determine that address ranges other than those assigned by the guest firmware 536 are more suitable. Should the guest operating system 534 change the address ranges assigned to the emulated PCI endpoints 562, 564, peer-to-peer transactions without the IOMMU 504 would no longer be possible.

In various implementations, the guest operating system 534 can be prevented from modifying the configuration of the emulated PCI endpoints 562, 564 that was established by the guest firmware 536. As discussed above, in some implementations the host device 502 includes an Advanced Configuration and Power Interface (ACPI). ACPI provides a hardware emulator table, referred to as the Differentiated System Description Table (DSDT), which includes an entry for each hardware component in the system 500. In various implementations, the guest operating system 534 can modify the configuration of hardware components by writing to entries in the hardware emulator table. The ACPI specification, however, provides that address ranges for certain hardware components, such as PCI devices, can be reserved. For example, ACPI provides that the base address and address range of a device can be written into a memory descriptor in the hardware emulator table, to reserve an address range for a PCI device.

Thus, in various implementations, the system 500 can be configured to reserve address spaces in the hardware emulator table for each of the PCI endpoints 510, 512. Specifically, the hardware emulator table can be compiled with fixed addresses in the entries for reserving address spaces for the PCI devices. When the guest operating system 534 reads these entries, the guest operating system 534 will find the entries reserved, and may thus not itself attempt to assign address spaces to the PCI devices.

The guest operating system 534, however, can use the hardware emulator table to obtain the address ranges of the PCI endpoints 510, 512. Using the address ranges, the guest operating system 534 can then generate transactions that target those address ranges. To maintain the operability of the peer-to-peer configuration described above, the hardware emulator table thus should contain the physical address ranges of the PCI endpoints 510, 512.

The hardware emulator table is typically distributed, with the host device 502, as compiled byte code. When the hardware emulator table is compiled, the hardware emulator table can be configured with the physical base addresses of the PCI endpoints 510, 512 as the fixed addresses used to reserve address spaces for PCI devices. Similar to hardcoding these addresses into the guest firmware 536, however, compiling the hardware emulator table with a set of physical base addresses renders the hardware emulator table unportable, meaning the hardware emulator table would have to be recompiled for every platform. Hardcoded addresses thus limit the flexibility of the hardware emulator table.

In various implementations, generic fixed addresses can instead be used to reserve address spaces in the hardware emulator table. Examples of generic addresses include all zeros or all ones or a well-known pattern such as 0xDEAD-BEEF. Using generic addresses, the hardware emulator table need only be compiled once, and the resulting byte code can be used on multiple systems. The generic addresses can further have a similar effect on the guest operating system 534 as would the physical PCI endpoint 510, 512 addresses, in that the address spaces for the PCI endpoints 510, 512 appear reserved. The guest operating system may thus avoid overwriting the configured address spaces.

The hardware emulator table, however, still needs to be programmed with the physical addresses of the PCI endpoints 510, 512. To program the hardware emulator table with the physical addresses of the PCI endpoints 510, 512, the guest firmware 536 can, after having obtained the addresses, write the addresses and the sizes of the address ranges to the hardware emulator table. The generic addresses that the hardware emulator was compiled with can thus be replaced with the physical addresses of the PCI endpoints 510, 512. Thereafter, the guest operating system 534 will be provided with the physical addresses when the guest operating system 534 reads the hardware emulator table to obtain the address ranges of the PCI endpoints 510, 512.

In various implementations, the guest firmware 536 can also consolidate the address ranges of each PCI endpoint 510, 512 when writing the address ranges to the hardware emulator table. For example, PCI Endpoint 0 510 may have multiple blocks of memory, each with a separate address range. In this example, the guest firmware 536 can combine address ranges for the multiple blocks into a single hardware emulator table entry. For example, as noted above, the hardware emulator table entry can include a base address and an address range for a PCI device. In this example, the base address and address range can be programmed to encompass two or more memory blocks of PCI Endpoint 0 510. In various implementations, the guest firmware 536 can also combine memory blocks from multiple PCI endpoints into one entry in the hardware emulator table.

Address block consolidation can allow the system 500 to make more efficient use of the hardware emulator table. For example, in some older systems, the hardware emulator table has fewer entries than in newer systems. The fewer entries can limit the number of PCI devices that can be supported by the system. By consolidating address blocks into fewer entries of the hardware emulator table, the system can support more PCI devices.

Figure 6A:
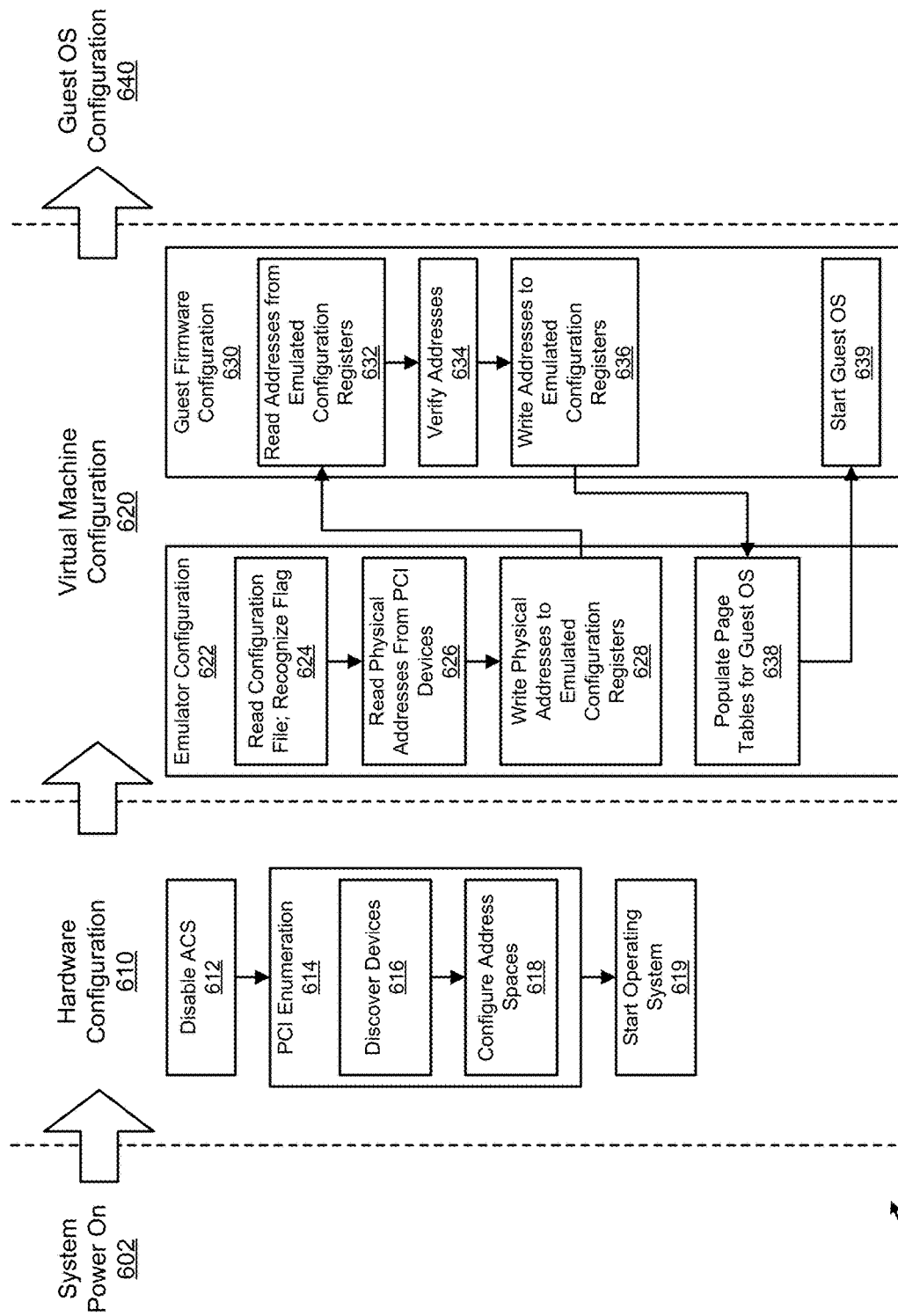
FIG. 6A-6B illustrate an example of a process for configuring a computing system to enable peer-to-peer communications between PCI endpoint devices.
Figure 6B:
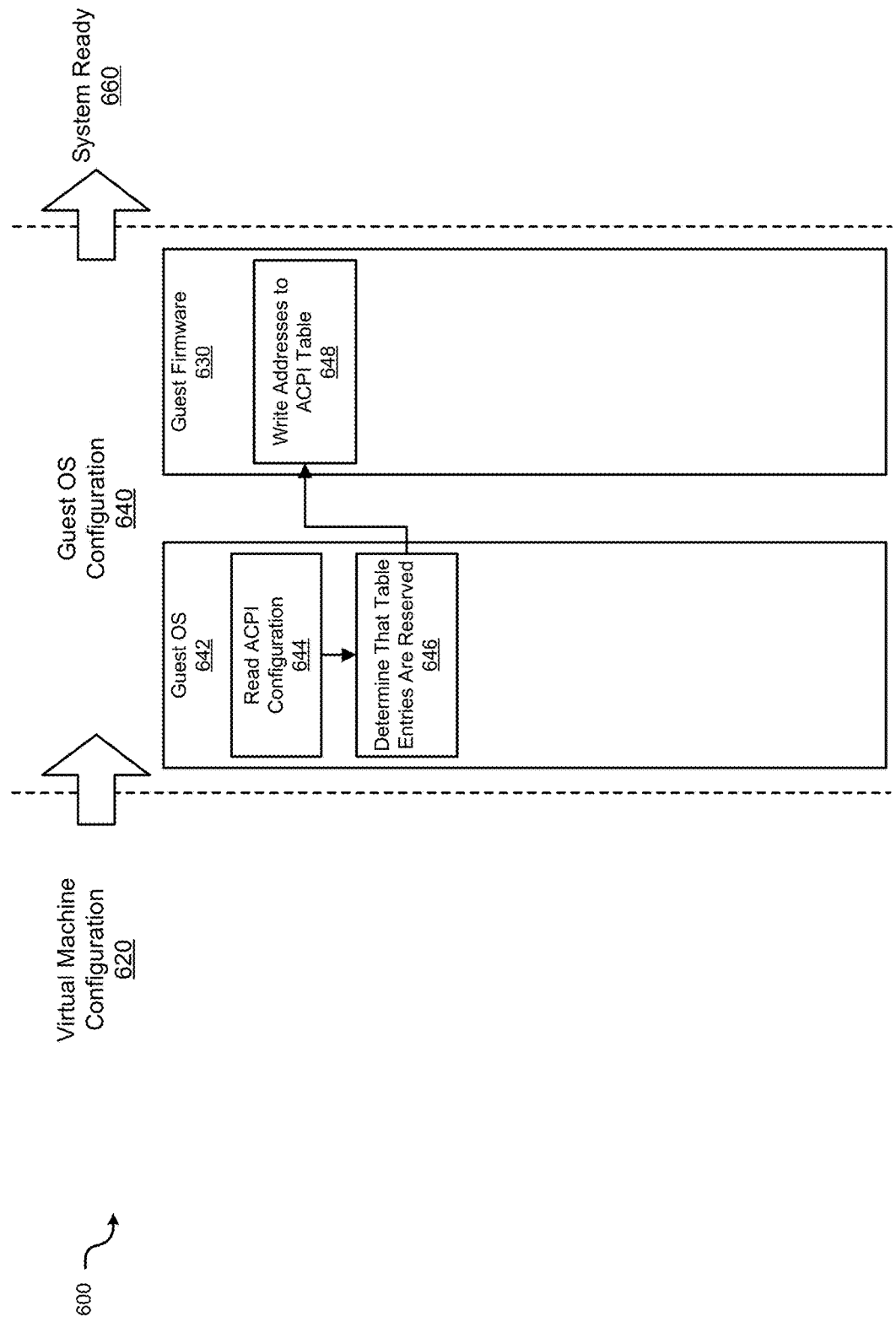

FIGS. 6A-6B illustrate an example of a process 600 for configuring a computing system to enable peer-to-peer communications between PCI endpoint devices. In various implementations, the process 600 can be executed by a computing system such as the example computing systems illustrated in FIGS. 3A-3B, FIG. 4, and FIGS. 5A-5B. In various implementations, the process 600 of FIG. 6 can include boot-up procedures executed by a processor and/or other hardware included in the computing system, where the boot-up procedures are provided as instructions stored in non-volatile memory. In various implementations, the process 600 can also include post-boot-up procedures executed by the processor, where the post-boot-up procedures are provided as instructions in either volatile or non-volatile memory.

In various implementations, the process 600 may begin when the computing system experiences a system power on 602. A system power on 602 occurs when power is provided to the computing system. In some implementations, the computing system can also experience a state similar to a system power on 602 after being reset. For example, a "hard reset" can be similar to the computing system having been shut off then powered back on.

In various implementations, after system power on 602, the computing system may execute hardware configuration 610. The hardware configuration 610 phase may include basic configuration necessary to make the computing system operable (e.g., capable of executing software). For example, hardware configuration 610 may include executing a BIOS or some similar code. In some cases, a computing system includes a BIOS chip, whose purpose is to execute the BIOS code, though in other cases, the BIOS code is executed by a processor. The BIOS code generally locates and tests the hardware components in a computing system to establish the identities, configuration, and/or capabilities of each device. In some implementations, the BIOS code may also include PCI device enumeration procedures. BIOS code is typically stored on an Electrically Erasable Programmable Read-Only Memory (EEPROM).

In various implementations, during hardware configuration 610, the process 600 may, at step 612, include disabling Access Control Services (ACS) for some PCI devices. Specifically, Access Control Services may be disabled for switches that are connected (directly or indirectly) to PCI endpoints that will execute peer-to-peer communications with each other. Disabling Access Control Services allows a switch device to transfer a transaction from one PCI endpoint to another PCI endpoint without first sending the transaction to a host device. In some implementations, the disabling of the Access Control Services may be included in the BIOS code. In some implementations, Access Control Services may be disabled by configuration code stored in an EEPROM, which may be executed in the course of executing the BIOS code.

In various implementations, after disabling Access Control Services at step 612, the process 600 may proceed to PCI enumeration, at step 614. As discussed above, during enumeration, the computing system may, at step 616, discover devices attached to the computing system. Specifically, starting at the root complex, the system can scan available ports and identify endpoints, switches, and/or bridges. When the system locates a switch or bridge, the system can scan the ports of the switch or bridge to identify additional endpoints, switches, or bridges.

Once the system has discovered all the devices included in the system, the system may then, at step 618, configure address spaces for each device and ports in the system. Configuring the address spaces can include assigning an address range to each endpoint. Configuring the address spaces can further include assigning address ranges to switch ports, where the address ranges assigned to the switch ports indicate the range of address available at the switch port.

At the end of the hardware configuration 610 stage, the BIOS code may start a boot loader. The boot loader may load the operating system into memory, and, at step 619 start the operating system. In some cases, the BIOS code may itself load and start the operating system. The operating system can, among other things, initialize a hypervisor and execute other steps to configure a virtualization environment.

Once the operating system is running, the system can also execute virtual machine configuration 620. Virtual machine configuration 620 can include emulator configuration 622. At step 624, the emulator application may read a configuration file. The configuration file can include a flag or key-value pair or some other indicator, which indicates that the system is being configured for peer-to-peer communications. When the system is being configured for peer-to-peer communications, the emulator application, at step 626, reads physical addresses from physical PCI devices in the system. These addresses generally include base addresses for the address ranges assigned to each PCI device, among other addresses. The emulator application can also read the size of the address range. As discussed above, these address ranges can be assigned at step 618 during PCI enumeration at step 614.

Once the emulator application has obtained the physical addresses, the emulator application may next, at step 628, write the addresses to emulated configuration registers. The emulated configuration registers may be part of an emulated device being emulated by the emulator application. For example, the emulator application may generate an emulated PCI endpoint for each physical PCI endpoint in the system. The emulated PCI endpoints can have emulated registers, which can be read by a guest operating system in the same way that a host operating system can read the corresponding physical configuration registers.

When, at step 624, the indicator in the configuration file does not indicate that the system is being configured for peer-to-peer communications, steps 626 and 628 and the guest firmware configuration 630, discussed below, would not be executed.

Once emulator configuration 622 is past this point, the guest firmware configuration 630 may begin. As discussed above, the guest firmware can configure a virtual machine environment. This configuration can include, at step 632, reading addresses that were written to the emulated configuration registers at step 628. In various implementations, the guest firmware can, at step 634, verify the addresses. Verifying the address can include, for example, determining whether the addresses are within an address range that can be used by the guest virtual machine. Verifying the addresses can also include, for example, confirming that the addresses do not overlap in an incompatible manner. Verifying the addresses can include other operations as well.

Having verified the addresses, the guest firmware can next, at step 636 write the addresses back to the emulated configuration registers. Writing the addresses back to the emulated configuration registers can cause the emulator to configure the emulated PCI devices, including, at step 638, populating page tables for the guest operating system. The page tables can provide an address mapping between the virtual addresses used within the virtual machine and the physical addresses of the host system. In other processes, the guest firmware would have determined virtual address spaces for the emulated PCI devices in the system, and would have written virtual base addresses for these virtual address spaces at step 636. In the example process 600, however, the guest firmware writes the physical addresses the guest firmware obtained at step 632. In this way, what would otherwise be virtual addresses in the page tables are instead populated with physical addresses. From the guest operating system's perspective, the guest operating system cannot tell the difference, and will use the physical addresses from the page tables as if these addresses were virtual addresses.

Once the page tables are populated, the guest firmware can, at step 639, start the guest operating system. In some implementations, the process 600 may also include a guest operating system configuration 640. FIG. 6B illustrates the guest operating system configuration 640. In various implementations, the guest operating system 642 may, at step 644, read an ACPI configuration. As discussed above, ACPI specifies, among other things, the manner in which a computer's BIOS, operating system, and peripheral devices communicate with each other about power usage. Among other things, the ACPI provides a hardware emulator, mostly implemented in the DSDT table.

In some implementations, the guest operating system 642 may change the address spaces assigned to peripheral devices, for example, to have the peripheral devices use addresses that are more convenient for the guest operating system 642. To do so, the guest operating system 642 may determine new base addresses, and write these base addresses to the hardware emulator table. The hardware emulator table may have, for example, an entry for each PCI endpoint in the system. If the guest operating system 642 were allowed to change the base addresses of the PCI endpoints, however, the peer-to-peer configuration would become inoperable. Thus, in various implementations, the system is provided with a hardware emulator table that is compiled with the entries for the PCI endpoints already filled in with reserved address spaces. When the guest operating system 642 reads the ACPI configuration, the guest operating system 642 may, at step 646, determine that the relevant table entries (e.g., those that define the address ranges for PCI devices) are already reserved. The guest operating system 642 may thus bypass or ignore the entries, and not determine a virtual address space for these devices.

The hardware emulator table is typically provided as compiled byte code, and thus the entries being used to reserve address spaces for the PCI endpoints can be filled in with placeholder addresses. The placeholder addresses can be determined so that the guest firmware can, upon reading the entries, determine that the entries are reserved but not with valid addresses. For example, the placeholder addresses can be set to all zero. When the guest firmware 630 determines that the relevant entries in the hardware emulator table have placeholder addresses, the guest firmware 630 can, at step 648, write the addresses obtained at step 632 into the hardware emulator table. In this way, the physical addresses for the PCI endpoints can be uniformly maintained at each point at which the addresses are used. In some implementations, the guest firmware 630 can also consolidate memory blocks in from one device and/or from multiple devices into one entry in the hardware emulator table, instead of using multiple entries.

Once the addresses obtained at step 632 have been written into the hardware emulator table, the system can enter a system ready 660 state. In this state, the system is ready for normal operation, including the sending and receiving of peer-to-peer transactions.

Figure 7:
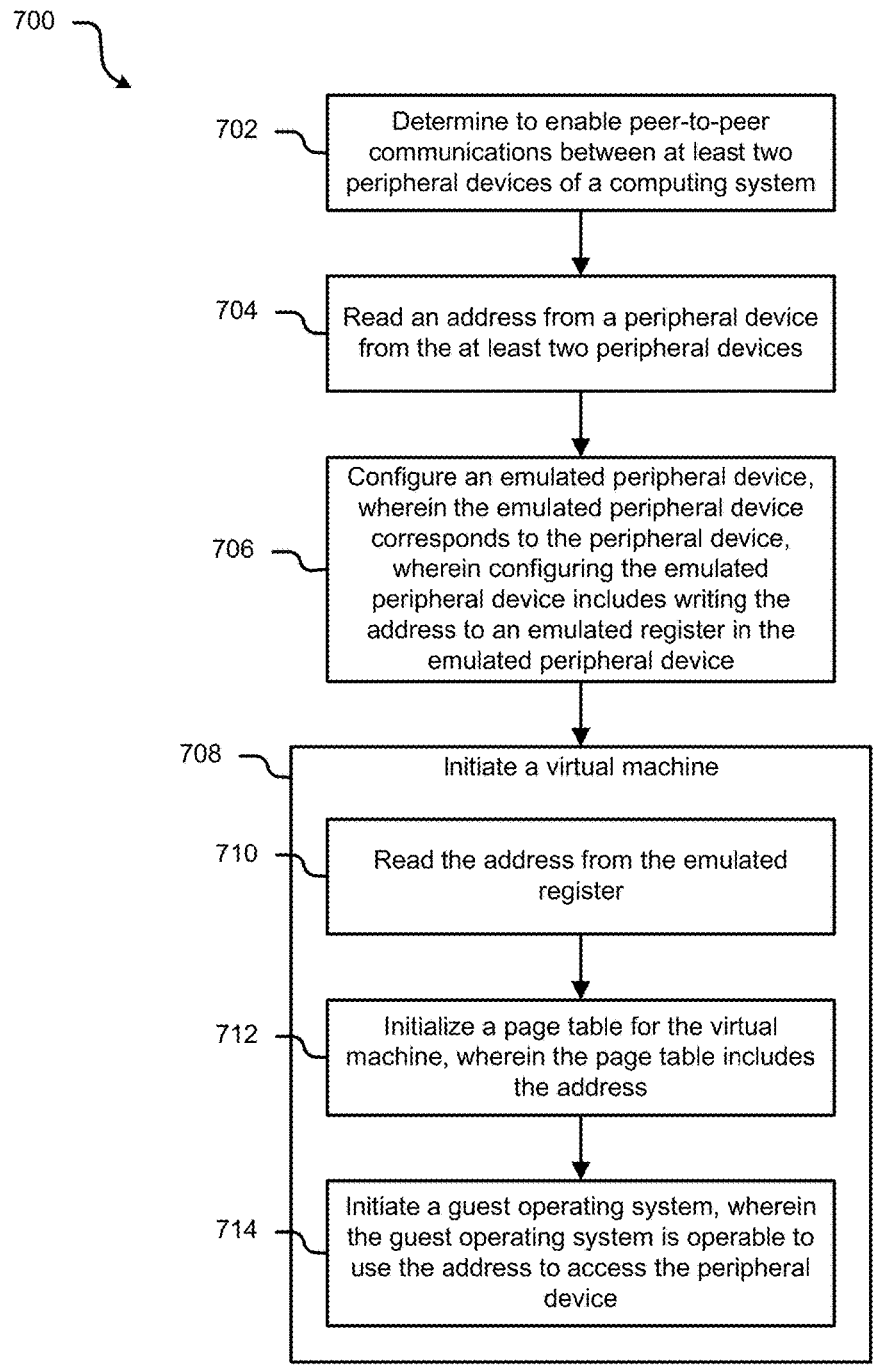
FIG. 7 illustrates examples of a process for configuring a system to enable peer-to-peer communication between peripheral devices of the system.

FIG. 7 illustrates examples of a process 700 for configuring a system to enable peer-to-peer communication between peripheral devices of the system. The example process 700 can be implemented by a computing system that includes peripheral devices and a virtualized software environment, such as, for example, the systems illustrated in FIGS. 3A-3B, FIG. 4, and FIGS. 5A-5B.

At step 702, the process 700 includes determining to enable peer-to-peer communications between at least two peripheral devices of a computing system. In various implementations, the system determines to enable peer-to-peer communications when an emulator application reads a configuration file. The emulator application may be launched by hypervisor or host operating system to support the virtualized software environment. The emulator application can provide emulated hardware devices to virtual machines running in the virtualized software environment. The emulated hardware devices can represent actual, physical hardware components and/or hardware components that are not present in the system. The emulated hardware devices can be the same as, or different from, physical hardware components.

In various implementations, the emulator application reads the configuration file to determine, for example, the configuration of emulated hardware devices. In various implementations, the configuration file can include a flag or value or other indicator that can inform the emulator whether the system is being configured for peer-to-peer communication. When the indicator indicates that the system is being configured for peer-to-peer communication, the process 700 next, at step 704, includes reading an address from a peripheral device from the at least two peripheral devices. The address may be read from a configuration register. The address may represent a base address of an address range of the peripheral device.

At step 706, the process 700 includes configuring an emulated peripheral device, wherein the emulated peripheral device corresponds to the peripheral device from which the address was read in step 704. Configuring the emulated peripheral device can include writing the address to an emulated register in the emulated peripheral device. In various implementations, the emulated peripheral device can be configured by an emulator application. In these implementations, the emulator application can be configured to read the address from the peripheral device.

At step 708, the process 700 includes initiating a virtual machine. In various implementations, the virtual machine can be initiated by a guest firmware application. Initiating a virtual machine can include, at step 710, reading the address from the emulated register in the emulated peripheral device. In various implementations, the address can be read by the guest firmware application. In these implementations, the guest firmware application can further verify the address. Verifying the address can include determining whether the address is valid, is within an address range that can be reached by the virtual machine, does not conflict with other addresses that will be used by the virtual machine, and/or can be included as an address in an MMIO configuration, among other things.

At step 712, initiating the virtual machine can further include initializing a page table for the virtual machine, wherein the page table includes the address read at step 704. In various implementations, initializing the page table can include writing the address to the emulated peripheral device. In these implementations, writing the address causes initiation of the page table. The page table can provide a mapping of virtual addresses in the address space of the virtual machine to physical addresses in the address space of the peripheral device. In the example process 700, the page table has instead been configured to map the address read at step 704 to the physical address of the peripheral device; that is, the address is mapped to itself.

At step 714, initiating the virtual machine can further include initiating a guest operating system, wherein the guest operating system is operable to use the address read at step 704 to access the peripheral device. The guest operating system can, for example, generate read and write transactions to the peripheral device, where the transactions include the address (or an address in an address range defined by the address read at step 704) to target the transaction at the peripheral device.

In various implementations, the process 700 can further include configuring an entry in a hardware emulator table with a placeholder address. The hardware emulator table can be used by the system to provide an operating system with access to the hardware components of the system. The placeholder address can reserve an address space for a peripheral device. In various implementations, the process 700 can further include writing the address read at step 704 to the entry that contains the placeholder address.

In various implementations, the process 700 can further include transmitting, by one of the peripheral devices in the system, a transaction to another peripheral device. The transaction can use an address within the address range of the other peripheral device, where this address will be a physical address. In various implementations, the peripheral device can have obtained this physical address from the guest operating system. A switch device that is coupled to both peripheral devices can receive the transaction, and can transmit the transaction to the other peripheral device. The transaction is thus transmitted peer-to-peer. In various implementations, access control services are disabled for the switch, in order to enable peer-to-peer communication.

Figure 8:
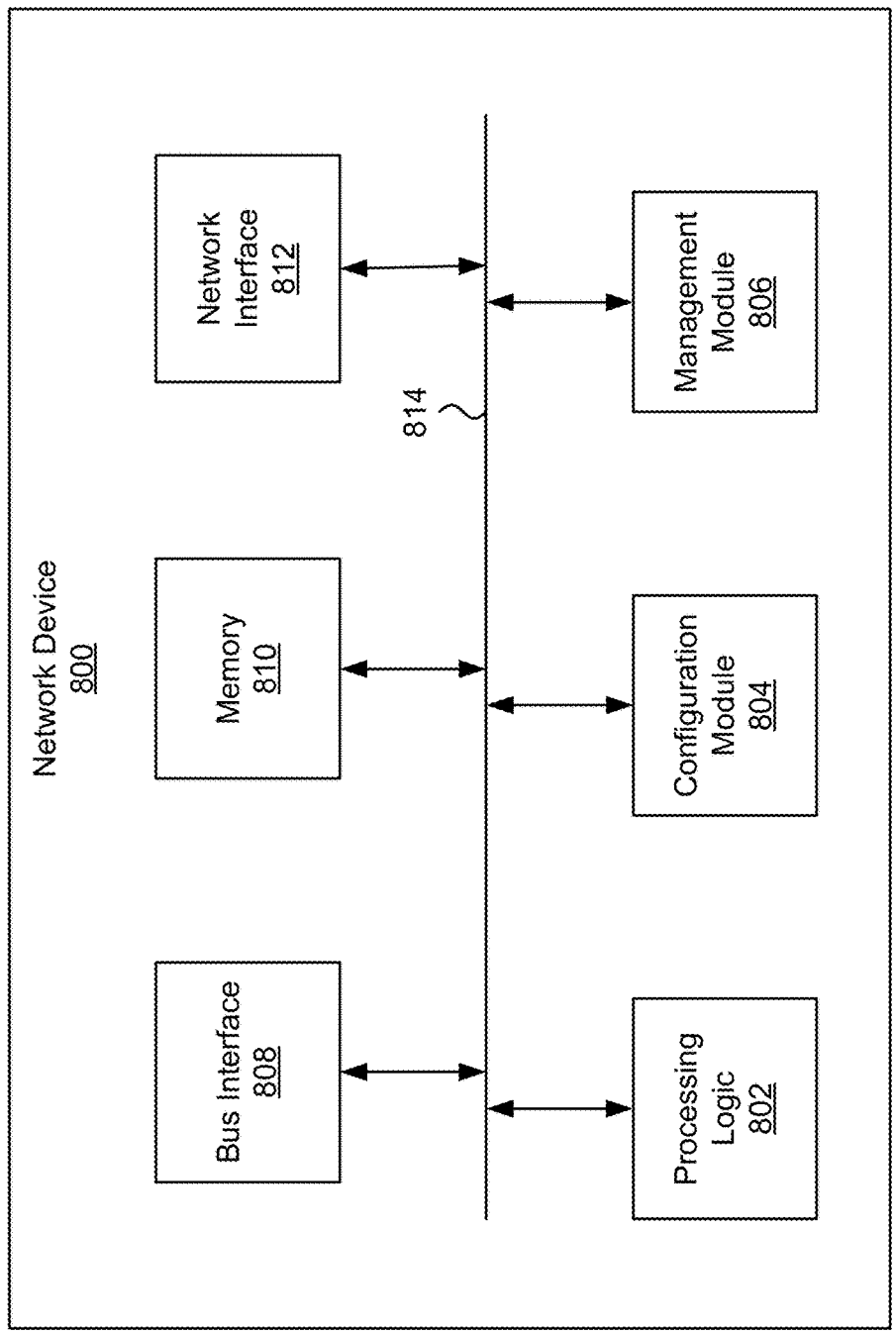
FIG. 8 illustrates an example of a network device, according to certain aspects of the disclosure.

FIG. 8 illustrates an example of a network device 800. Functionality and/or several components of the network device 800 may be used without limitation with other embodiments disclosed elsewhere in this disclosure, without limitations. A network device 800 may facilitate processing of packets and/or forwarding of packets from the network device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 800 may be the recipient and/or generator of packets. In some implementations, the network device 800 may modify the contents of the packet before forwarding the packet to another device. The network device 800 may be a peripheral device coupled to another computer device, a switch, a router or any other suitable device enabled for receiving and forwarding packets.

In one example, the network device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The network device 800 may include additional modules, not illustrated here, such as components discussed with respect to the nodes disclosed in FIG. 9. In some implementations, the network device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the network device 800, while in other cases some or all of the memory may be external to the network device 800. The memory 810 may store an operating system comprising executable instructions that, when executed by the processing logic 802, provides the execution environment for executing instructions providing networking functionality for the network device 800. The memory may also store and maintain several data structures and routing tables for facilitating the functionality of the network device 800.

In some implementations, the configuration module 804 may include one or more configuration registers. Configuration registers may control the operations of the network device 800. In some implementations, one or more bits in the configuration register can represent certain capabilities of the network device 800. Configuration registers may be programmed by instructions executing in the processing logic 802, and/or by an external entity, such as a host device, an operating system executing on a host device, and/or a remote device. The configuration module 804 may further include hardware and/or software that control the operations of the network device 800.

In some implementations, the management module 806 may be configured to manage different components of the network device 800. In some cases, the management module 806 may configure one or more bits in one or more configuration registers at power up, to enable or disable certain capabilities of the network device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the network device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 800 may include multiple network interface modules, each configured to communicate with a different network. For example, in these implementations, the network device 800 may include a network interface module for communicating with a wired Ethernet network, a wireless 802.11 network, a cellular network, an Infiniband network, etc.

The various components and modules of the network device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 9:
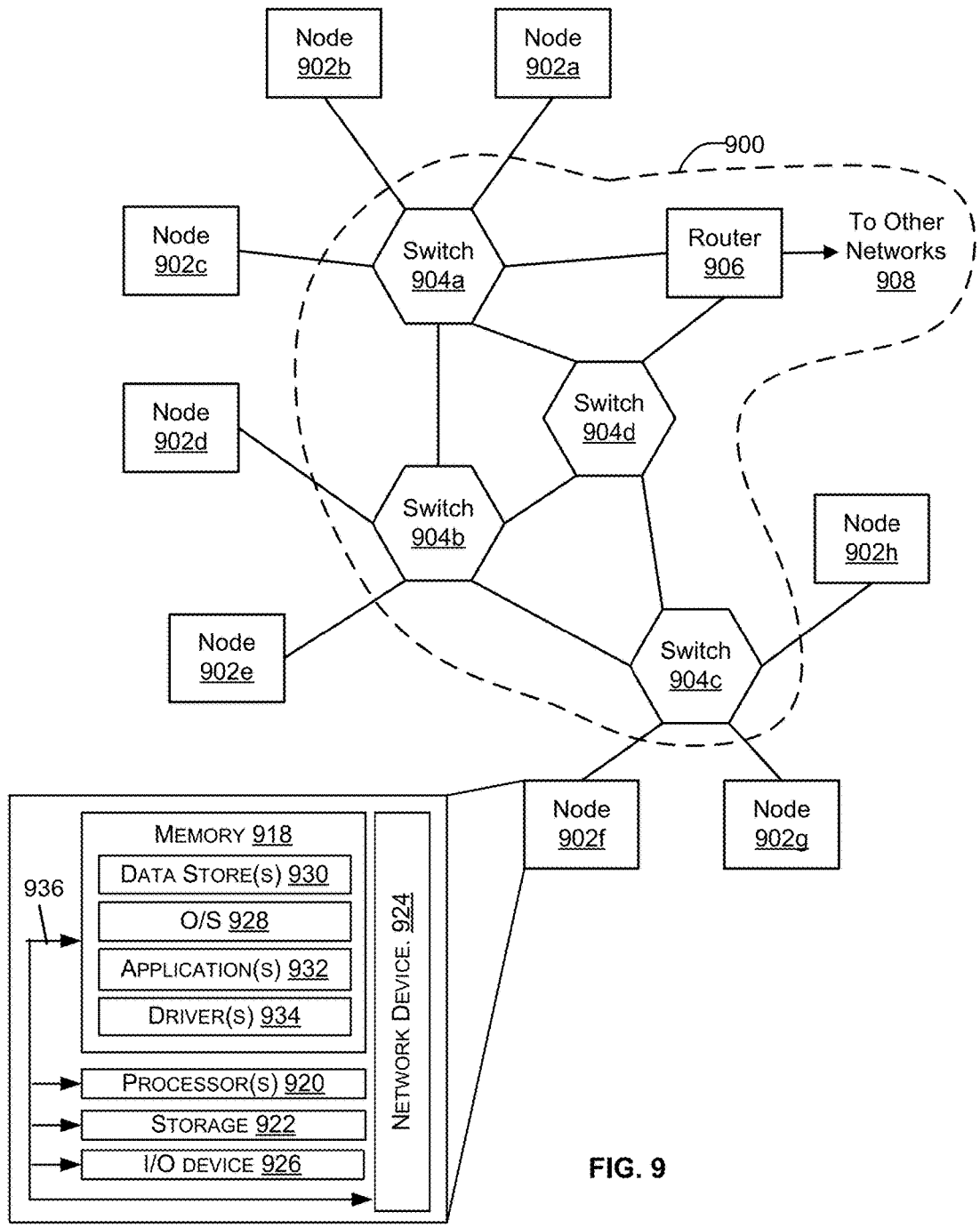
FIG. 9 illustrates an example architecture for features and systems described herein that includes one or more service provider computers and/or a user device connected via one or more networks, according to certain aspects of the disclosure.

FIG. 9 illustrates a network 900, illustrating various different types of network devices 800 of FIG. 8, such as nodes comprising the network device, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices 800 for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device (s) 924 that allow the node(s) 902a-902h to communicate with a stored database, another computing device or server, user terminals and/or other devices on the network(s) 900. The network device(s) 924 of FIG. 9 may include similar components discussed with reference to the network device 800 of FIG. 8.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system, comprising:
   a host device comprising a processor and memory;
   a Peripheral Component Interconnect (PCI) switch device coupled to the host device; and
   a first PCI endpoint device coupled to the PCI switch device;
   wherein the memory includes instructions that, when executed by the processor, cause the processor to perform operations including:
   initializing an emulator application, wherein initializing the emulator application includes:
   reading a configuration file;
   determining, using the configuration file, to enable PCI peer-to-peer communication;

reading one or more base addresses from the first PCI endpoint device; and
initializing an emulated PCI endpoint device, wherein initializing the emulated PCI endpoint device includes writing the one or more base addresses to corresponding emulated registers in the emulated PCI endpoint device;
initializing a guest firmware, wherein initializing the guest firmware includes:
reading the one or more base addresses from the emulated registers;
verifying the one or more base addresses; and
writing the one or more base addresses to the emulated registers, wherein the emulator application initializes a page table, and wherein initializing the page table includes storing the one or more base addresses in the page table; and
initializing a guest operating system in a virtual machine, wherein, when the guest operating system generates a transaction to the first PCI endpoint device, the guest operating system uses the one or more base addresses.

2. The computing system of claim 1, wherein the memory further includes instructions that, when executed by the processor, cause the processor to perform operations including:
reading, by the guest operating system, a hardware emulator table, wherein the hardware emulator table includes one or more entries that contain placeholder addresses, wherein the placeholder addresses prevent the guest operating system from using the one or more entries; and
writing, by the guest firmware, the one or more base addresses to at least one of the one or more entries that contain placeholder addresses.

3. The computing system of claim 1, further comprising:
a second PCI endpoint device;
wherein the memory further includes instructions that, when executed by the processor, cause the processor to perform operations including:
transmitting, by the guest operating system, a first transaction to the first PCI endpoint device, wherein the first transaction uses the one or more base addresses; and
upon receiving the first transaction, transmitting, by the first PCI endpoint device, a second transaction, wherein the second transaction uses a base address associated with the second PCI endpoint device.

4. The computing system of claim 1, wherein the first PCI endpoint device is configured for passthrough access, wherein the passthrough access is available to the guest operating system.

5. The computing system of claim 1, wherein the first PCI endpoint device includes a parallel computing engine.

6. A method, comprising:
determining, by a host device in a computing system, to enable peer-to-peer communication between at least two peripheral devices of the computing system;
reading an address from a peripheral device from the at least two peripheral devices;
configuring an emulated peripheral device, wherein the emulated peripheral device corresponds to the peripheral device, wherein configuring the emulated peripheral device includes writing the address to an emulated register in the emulated peripheral device; and
initiating a virtual machine, wherein initiating the virtual machine includes:
reading the address from the emulated register;
initializing a page table for the virtual machine, wherein the page table includes the address; and
initiating a guest operating system, wherein the guest operating system is operable to use the address to access the peripheral device.

7. The method of claim 6, wherein determining to enable peer-to-peer communication includes reading a configuration file for an emulator application, wherein the configuration file includes a value that indicates whether to enable peer-to-peer communication.

8. The method of claim 6, wherein the emulated peripheral device is configured by an emulator application, and wherein the emulator application is configured to read the address from the peripheral device.

9. The method of claim 6, wherein the virtual machine is initiated by a guest firmware application, wherein the guest firmware application reads the address from the emulated register, and wherein the guest firmware application verifies the address.

10. The method of claim 6, wherein initiating the page table includes:
writing the address to the emulated peripheral device, wherein the writing the address causes initiation of the page table.

11. The method of claim 6, further comprising:
configuring an entry in a hardware emulator table with a placeholder address, wherein the placeholder address reserves an address space for the peripheral device.

12. The method of claim 6, further comprising:
writing the address to an entry in a hardware emulator table that contains a placeholder address.

13. The method of claim 6, further comprising:
reading a second address from the peripheral device, wherein the second address provides a second base address for a second address block, and the address provides a first base address for a first address block;
combining the first address block and the second address block into a single address block, wherein the single address block includes a single base address; and
writing the single base address into an entry in a hardware emulator table that contains a placeholder address.

14. The method of claim 6, further comprising:
transmitting, by the peripheral device, a transaction to second peripheral device from the at least two peripheral devices, wherein the transaction uses an address of the second peripheral device;
receiving, by a switch device, the transaction, wherein the switch device is coupled to the peripheral device and the second peripheral device; and
transmitting, by the switch device, the transaction to the second peripheral device.

15. The method of claim 6, further comprising:
disabling access control services for a switch device in the computing system, wherein at least two peripheral devices are coupled to the switch device.

16. The method of claim 6, wherein the emulated peripheral device provides the guest operating system with direct use of the peripheral device.

17. The method of claim 6, wherein the peripheral device from the at least two peripheral devices is a Peripheral Component Interconnect Express (PCIe) device.

18. The method of claim 14, wherein the peripheral device obtains the address of the second peripheral device from the guest operating system.

19. A non-transitory computer-readable medium including instructions that, when executed by one or more processors, cause the one or more processors to:
- determine to enable peer-to-peer communication between at least two peripheral devices of a computing system;
- read an address from a peripheral device from the at least two peripheral devices;
- configure an emulated peripheral device for the peripheral device, wherein configuring the emulated peripheral device includes writing the address to an emulated register in the emulated peripheral device;
- initiate a virtual machine, wherein initiating the virtual machine includes:
  - reading the address from the emulated peripheral device; and
  - initializing a page table for the virtual machine, wherein the page table includes the address; and
- initiate a guest operating system, wherein the guest operating system is operable to use the address to access the peripheral device.

20. The non-transitory computer-readable medium of claim 19, wherein determining to enable peer-to-peer communication includes reading a configuration file for an emulator application, wherein the configuration file includes a value that indicates whether to enable peer-to-peer communication.

21. The non-transitory computer-readable medium of claim 19, wherein the emulated peripheral device is configured by an emulator application, and wherein the emulator application reads the address from the peripheral device.

22. The non-transitory computer-readable medium of claim 19, wherein the virtual machine is initiated by a guest firmware application, wherein the guest firmware application reads the address from the emulated register, and wherein the guest firmware application verifies the address.

23. The non-transitory computer-readable medium of claim 19, wherein the instructions for initiating the page table include instructions that, when executed by the one or more processors, cause the one or more processors to:
- write the address to the emulated peripheral device, wherein the writing of the address causes initiation of the page table.

24. The non-transitory computer-readable medium of claim 19, wherein the instructions for initiating the page table include instructions that, when executed by the one or more processors, cause the one or more processors to:
- write the address to an entry in a hardware emulator table that contains a placeholder address.

25. The non-transitory computer-readable medium of claim 19, further comprising instructions that, when executed by one or more processors, cause the one or more processors to:
- read a second address from the peripheral device, wherein the second address provides a second base address for a second address block, and wherein the address provides a first base address for a first address block;
- combining the first address block and the second address block into a single address block, wherein the single address block includes a single base address; and
- writing the single base address into an entry in a hardware emulator table that contains a placeholder address.

* * * * *